United States Patent
Duron et al.

(10) Patent No.: US 6,807,862 B2
(45) Date of Patent: Oct. 26, 2004

(54) DEVICE AND METHOD FOR DETERMINING AND DETECTING THE ONSET OF STRUCTURAL COLLAPSE

(75) Inventors: Ziyad H. Duron, Claremont, CA (US); William P. Wiesmann, Washington, DC (US); Loland Alexander Pranger, Montgomery Village, MD (US)

(73) Assignee: Sekos, Inc., Germantown, MD (US)

( * ) Notice: Subject to any disclaimer, the term of this patent is extended or adjusted under 35 U.S.C. 154(b) by 0 days.

(21) Appl. No.: 10/081,649

(22) Filed: Feb. 21, 2002

(65) Prior Publication Data

US 2003/0154786 A1 Aug. 21, 2003

(51) Int. Cl.$^7$ ................................................ G01P 1/02
(52) U.S. Cl. ........................................................ 73/649
(58) Field of Search ........................ 73/493, 587, 579, 73/586; 700/35, 36

(56) References Cited

U.S. PATENT DOCUMENTS

| | | | |
|---|---|---|---|
| 5,404,755 A | 4/1995 | Olson et al. | |
| 5,526,694 A | * 6/1996 | McEachern et al. | .......... 73/587 |
| 5,675,089 A | 10/1997 | Hawkins | |
| 6,138,516 A | 10/2000 | Tillman | |
| 6,292,108 B1 | * 9/2001 | Straser et al. | .......... 340/870.11 |

* cited by examiner

Primary Examiner—Hezron Williams
Assistant Examiner—Tamiko Bellamy
(74) Attorney, Agent, or Firm—Bartunek & Bhattacharyya, Ltd.

(57) ABSTRACT

A significant number of rescue workers are killed or injured each year as they conduct searches within damaged or burning structures, unaware that the structure is in imminent danger of collapse. The present invention provides a system and method for detecting and monitoring structural damages which are irreversible and which lead to inevitable collapse of a building or structure. The system includes at least one accelerometer that is housed in a device that is mounted on an exterior surface outside the burn area, and within the reach of the rescue worker. The device communicates with a remote display that provides visual and/or audible signals to indicate imminent collapse of the structure.

83 Claims, 17 Drawing Sheets

DEVICE AND METHOD FOR DETERMINING AND DETECTING THE ONSET OF STRUCTURAL COLLAPSE

STATEMENT OF GOVERNMENT INTEREST

As outlined under 37 CFR 401.14(b), the United States government shall have a nonexclusive, nontransferable, irrevocable, paid-up license to practice or have practiced for or on behalf of the United States the subject invention.

BACKGROUND OF THE INVENTION

Structural damage leading to collapse has resulted in injuries and death to rescue workers and others within the vicinity of the collapse. In many rescue operations, the condition of the structure plays a relatively minor role in deciding when and how to enter the structure, particularly if human lives are in danger. The typically complex nature of how damage propagates and may ultimately weaken a structure has made it very difficult to predict imminent collapse. Visual inspections alone, especially during firefighting operations, cannot guarantee detection of mechanisms that could lead to collapse and loss of life. A need exists, therefore, for a technical approach that can monitor structures that are severely damaged and in danger of collapse.

Collapse monitoring, however, is based on the premise that the degree of damage to the structure is so severe that continued exposure to the current loading condition will lead to imminent collapse. A burning structure is, by definition, already damaged due to the fire. The ability to simply detect and track damage mechanism due to fire does not provide a mechanism that will detect impending collapse.

Structural damage detection research is best characterized as using nondestructive testing techniques to determine the behavior of response characteristics under known loading conditions. The selection of the particular testing technique, however, plays a large role in the effectiveness of the detection technique. Prior art damage detection devices and methodologies do not provide nondestructive testing devices and methodologies.

Existing devices that detect damage in structures rely mainly on approaches that induce high frequency or acoustic energy into the structure or that use monitoring devices at critical locations within a structure.

U.S. Pat. No. 5,675,809 to Hawkins, for example, discloses a passive strain gauge that can be mounted to buildings. The gauge emits acoustic waves commensurate with load bearing stress exerted on a building in earthquakes and the like. Similarly, U.S. Pat. No. 5,404,755 to Olson, et al., disclose a method of testing stress in wood and other products using ultrasonic frequencies.

These types of gauges and methodologies operate over a wide frequency range, well beyond those associated with structural resonances. As such, they are not effective in isolating structural response behavior and do not possess the sensitivity required for collapse monitoring.

U.S. Pat. No. 6,138,516 (to Tillman) discloses a device that monitors the amount of shock applied to a location on a structure. The device is a shock detector and utilizes an accelerometer adapted to generate a rectified signal that is compared to a threshold level to produce a high voltage state. Detection of shock on a structure, however, cannot be used for monitoring structural response leading to lapse, particularly since Tillman utilizes a set threshold level below which the device remains in a low voltage state The need for determining impending structural failure is significant. The present invention provides a new and unique device and method for determining structural damage and imminent failure, which will help to prevent injuries and save the lives of rescue workers and persons within the realm of a building collapse.

SUMMARY OF THE INVENTION

It is, therefore, an objective of this invention to provide a system and method for determining the onset of collapse of a structure, detecting the progression of the collapse mechanism and detecting severely reduced structural integrity in the aftermath of a condition impacting the structure.

It is another objective of this invention to provide a system that utilizes at least one accelerometer that is capable of measuring acceleration responses down to zero Hz.

It is another objective of this invention to provide a system and method for detecting collapse of a structure using at least one accelerometer that is capable of measuring acceleration responses in at least one axial (x, y, or z) direction, utilizing the device of the present invention.

It is another objective of this invention to provide a system that utilizes a device that can be attached on an exterior surface away from damage conditions where the device is attached perpendicular to the direction of the portion of the structure being monitored.

It is yet another objective of this invention to provide a system that utilizes a device that is lightweight, waterproof and capable of withstanding temperatures of up to 1900° F.

It is yet another objective of this invention to provide a system that utilizes a device that operates on an independent power source.

It is yet another objective of this invention to provide a system that utilizes an outside power source including a building's power source that is being monitored for collapse conditions.

It is yet another objective of this invention to provide a system that utilizes analog and/or digital signals to evaluate data transmitted to a remote receiver of the system.

It is yet another objective of this invention to provide a system that utilizes computer technology to evaluate the transmitted signals to determine and detect collapse situations.

It is yet another objective of this invention to provide a system that utilizes wired and wireless communications to transmit signals from the device to the remote receiver.

These and other objects of this present invention are met by this invention as described herein below.

DETAILED DESCRIPTION OF THE EMBODIMENTS

Figure 1:
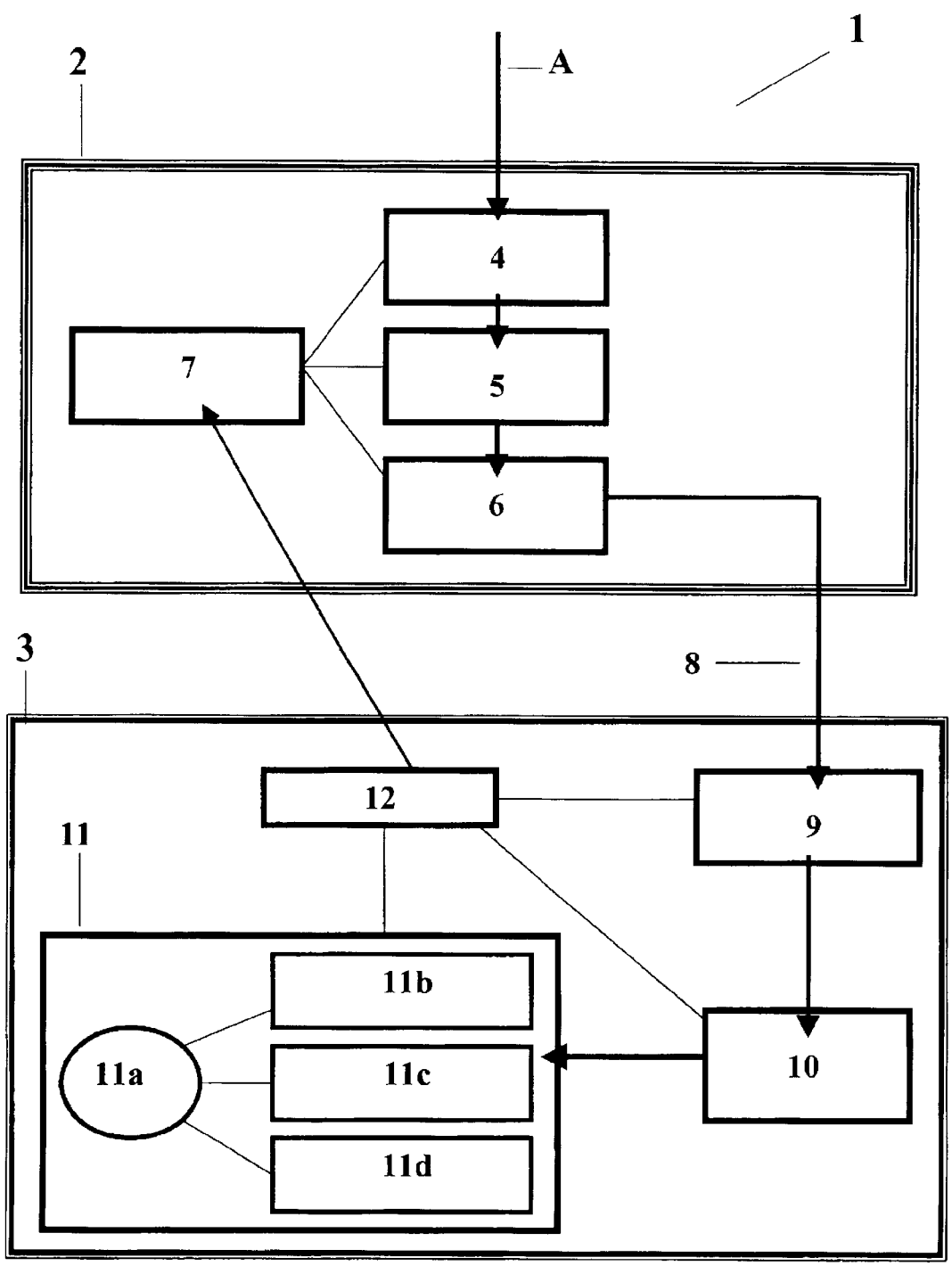
FIG. 1 shows an analog/through cable/wired system of the present invention.

The present invention is directed to the detection of imminent structural collapse. Detection of imminent structural collapse is distinguished from identifying damage detection of structures or buildings. Damage detection is primarily concerned with preventing large scale and sustained damage to a building or structure. Collapse detection, on the other hand, begins with the assumption that damage is irreversible.

All structures exhibit ambient response behavior when subject to naturally occurring excitations that may stem from wind, wave, operating facilities, or other situation specific responses, commensurate with environmental conditions in and around a structure.

The present invention is directed to detecting and monitoring this collapse mechanism as it grows and reaches maximum levels immediately prior to collapse. More specifically, this invention is directed to the determination of a threshold value or range of threshold values based upon naturally occurring and situation specific ambient responses identifying the initiation of a collapse, the progression of the collapse to a condition that indicates severely reduced structural integrity.

As it pertains to detecting impending collapse of a structure, the irreversible characteristics of a collapse mechanism, coupled with advances in computer and instrumentation technologies, have led to the present invention.

The system and method of the present invention utilizes ambient acceleration response measurements acquired on the structure due to externally applied excitations of which fire can be one example. The ambient accelerations include information pertaining to response magnitude and frequency content that can be related to the changing integrity of the structure leading to impending collapse. The present invention is capable of detecting low-level structural responses on the order of milli-g's over a frequency range 0–30 Hz and particularly in the range of 0–20 Hz.

The system and method of the present invention is based upon the inventors' findings that acceleration responses are not impacted by fire conditions in the same manner as other structural responses. A simplified physical interpretation of the acceleration response obtained from a collapsing structural component provides a mechanism for inevitable collapse. The collapsing structural component, i.e. a beam, manifests increasing vibration levels near the center of the beam during burn, followed by a large increase in acceleration, oriented in the downward direction, as pieces of the beam fall away. Both the burn and increasing acceleration levels are irreversible processes in the beam. Therefore, detecting the onset of the large increase or change in acceleration is critical to providing sufficient warning of imminent structural collapse. It is important to note that the ability to monitor ambient responses is itself not enough to predict impending collapse. Rather, it is the ability to detect the changes in ambient response levels that distinguishes this present invention.

An example of a situation specific ambient response of a collapse is a burning structure in which fire produces a random excitation that includes spectral energy spanning the traditional structural response range (typically below 100 Hz for most structures). Due to high temperatures and poor signal-to-noise content, detection of structural response under these conditions had previously been difficult.

The present invention provides a system and method for detecting and monitoring a collapse mechanism. The system and method of the present invention is passive. Embodiments of the present invention are shown in FIGS. 1 through 10. The present invention is not limited to these specific embodiments and variations of these embodiments are within the scope of the present invention.

The present system and method is also not limited to fire related collapse, but any collapse induced by structures absorbing energy beyond its load bearding capacities.

FIG. 1 shows an analog through cable wired system of the present invention. The system (1) of FIG. 1 provides a lightweight, portable device (2) and a display apparatus (3) that are utilized to detect and monitor collapse mechanisms at the time of fire or damage.

The device (2) of the system (1) includes at least one accelerometer (4) as a transducer for monitoring structural responses. Accelerometer (4) must be capable of monitoring acceleration in one to three axial directions (i.e., x, y or z axis), preferably oriented perpendicular to a mounting surface, and operates in the range of 0–30 Hz. Accelerometer (4) monitors responses down to DC or zero Hz. This is because accelerometer (4) tracks very low frequency responses corresponding to the changing mean accelerations in the structures. Accelerometers that are not capable of monitoring DC responses will filter or attenuate these responses around 4 Hz, and, therefore, be incapable of detecting changing mean accelerations approaching ultimate collapse. The device (2) also includes a low pass filter and amplifier (5) that is connected to the accelerometer (4) for signal gains equal to 100 over a 0–30 Hz range.

Device (2) also includes at least one transmitter (6) that is connected to the filter and amplifier (5). Bandwidth capabilities of the transmitter (6) shall be specified by the requirements imposed by environmental conditions and the highest desired frequency content in the signal.

The device (2) also includes a first power source (7) that is connected to the accelerometer (4), the filter and amplifier (5) and the transmitter (6). First power source (7) operates using both dependent and independent power supplies. Independent power supplies for the first power source (7) include batteries. The dependent power for power source (7)

will be described herein below. Other sources of power adaptable to the device (2) are also within the scope of this invention.

Figure 1A:
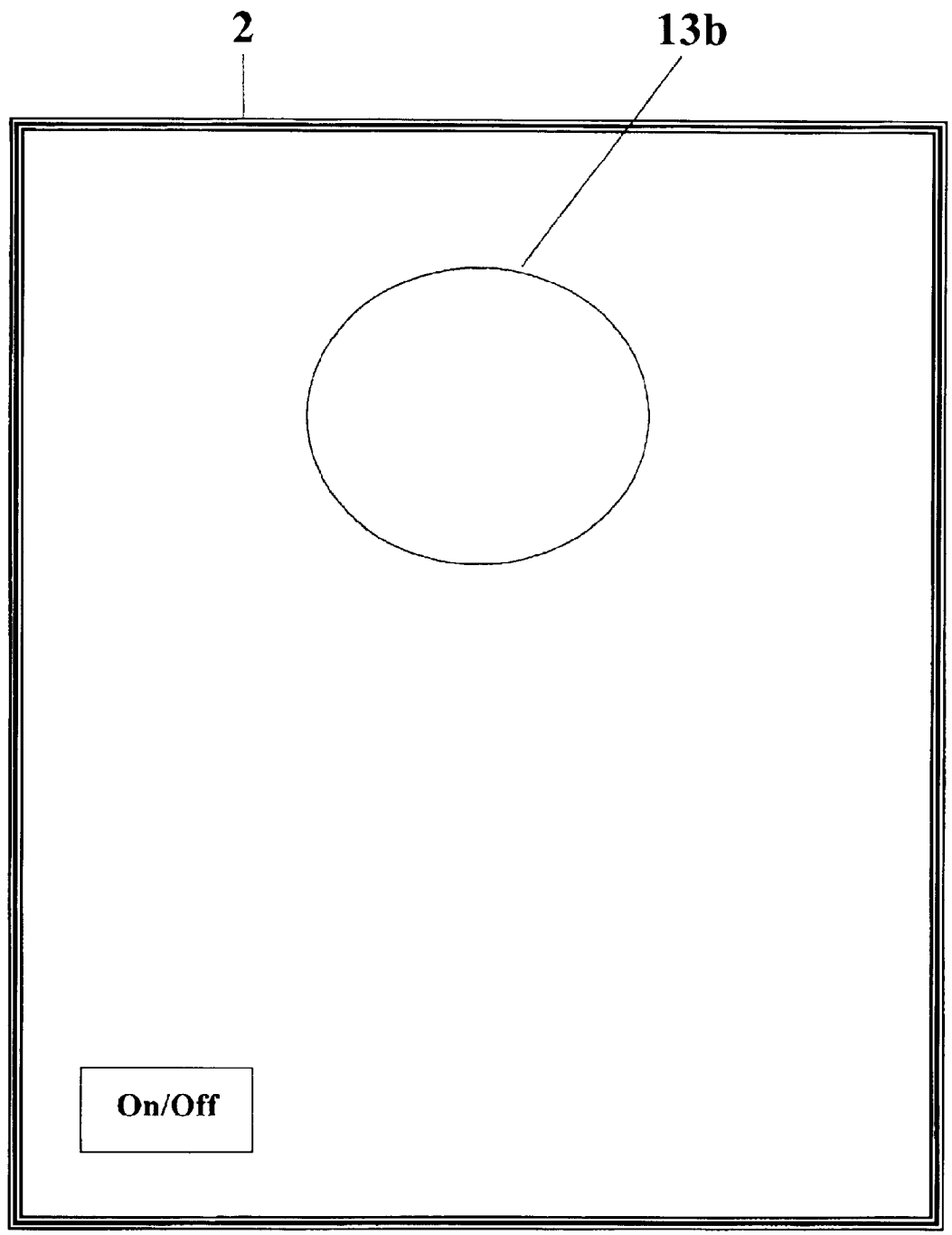
FIG. 1(a) shows a front side of the device of the system.

Transmitter (6) transfers analog response signals obtained from device (2) to the display apparatus (3) through a wired communication line (8). This analog signal is received by a remote receiver (9). The wired communication line (8) is covered with a fire retardant/heat retardant material suitable for high temperatures. The analog signal is then transferred to an A-D converter (10). The A-D converter then transfers the digitized signal to a computer system (11). The computer system (11) includes a computer processor unit (11a), a memory (11b), a display screen (11c) and a user input (11d). The computer processor unit (11a) compares threshold values relating the acceleration responses to structural conditions. Based on these values, computer processor unit (11a) provides a signal to device (2) that is displayed on the on/off indicator (13b) as shown in FIG. 1(a). The digitized signals can be displayed on display screen (11c) and/or stored onto memory (11b). Computer processor unit (11a) also provides on-site data reduction and analysis through designed software that allows for visual and audible characterizations of the measured responses on display (11c). The remote receiver (9), the A-D converter (10) and the computer system (11) are connected to a second power source (12). The second power source (12) can operate utilizing an internal power supply such as batteries. The second power source (12) is also capable of supplying power to first power source (7) when necessary. Other sources of power adaptable to the display apparatus (3) are also within the scope of this invention.

As shown in FIG. (1a), the device (2) is housed within a thermal casing (13) that protects the device (2) from heat damage up to 1900° F. The casing (13) includes a face plate (13a) having an on/off indicator (13b). The on/off indicator (13b) may incorporate a switch mechanism and/or an audio signal indicator and/or a visual signal indicator that is capable of mean tracking. The dimensions of device (2) are dependent upon the size of the various components listed above. However, the largest dimension of device (2) will not exceed 4 inches.

Figure 2:
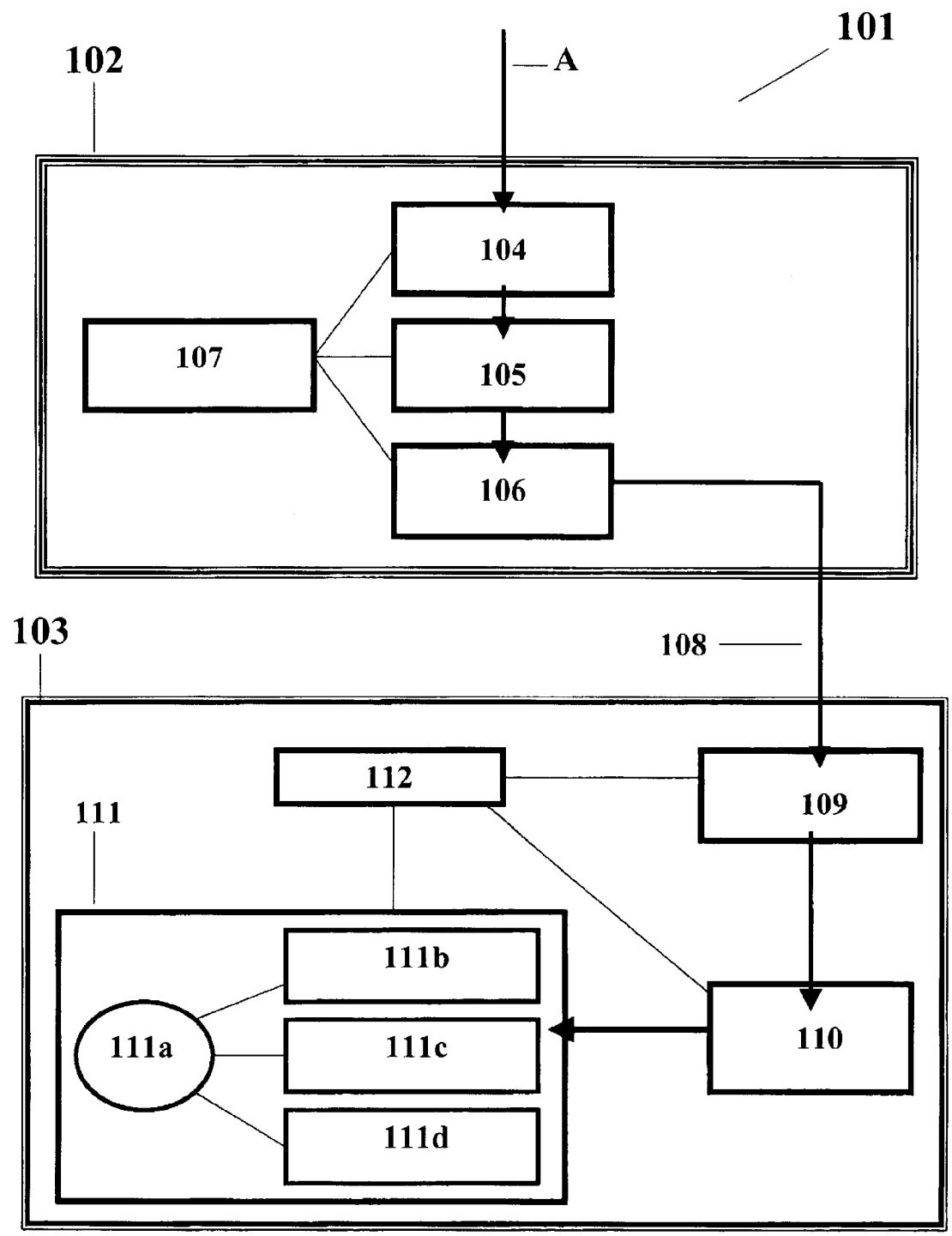
FIG. 2 shows an analog/internal power/wired system of the present invention.

FIG. 2 shows another embodiment of the present invention. System (101) of FIG. 2 provides a lightweight, portable device (102) and a display apparatus (103) that are utilized to detect and monitor collapse conditions at the time of fire or damage. The device (102) of the system (101) includes at least one accelerometer (104) as a transducer for monitoring structural responses. Accelerometer (104) must be capable of monitoring acceleration in one to three axial directions (i.e., x, y or z axis), preferably oriented perpendicular to a mounting surface, and operates in the range of 0–30 Hz. Accelerometer (104) monitors responses down to DC or zero Hz. This is because accelerometer (104) tracks very low frequency responses corresponding to the changing mean accelerations in the structures. Accelerometers that are not capable of monitoring DC responses will filter or attenuate these responses around 4 Hz, and, therefore, be incapable of detecting changing mean accelerations approaching ultimate collapse. The device (102) also includes a low pass filter and amplifier (105) that is connected to the accelerometer (104) for signal gains equal to 100 over a 0–30 Hz range.

Device (102) also includes at least one transmitter (106) that is connected to the filter and amplifier (105). Bandwidth capabilities of the transmitter (106) shall be specified by the requirements imposed by environmental conditions and the highest desired frequency content in the signal.

The device (102) also includes an independent first power source (107) that is connected to the accelerometer (104), the filter and amplifier (105) and the transmitter (106). The first independent power source (107) includes batteries. However, other sources of power adaptable to the device (102) are also within the scope of this invention.

Transmitter (106) transfers analog response signals obtained from device (102) to the display apparatus (103) through a wired communication line (108). This analog signal is received by a remote receiver (109). The wired communication line (108) is covered with a fire retardant/heat retardant material suitable for high temperatures. The analog signal is then transferred to an A-D converter (110). The A-D converter (110) then transfers the digitized signal to a computer system (111). The computer system (111) includes a computer processor unit (111a), a memory (111b), a display screen (111c) and a user input (111d). The computer processor unit (111a) compares threshold values relating the acceleration responses to structural conditions. Based on these values, computer processor unit (111a) provides a signal to device (102) that is displayed on the on/off indicator (13b) as shown in FIG. 1(a). The digitized signals can be displayed on display screen (111c) and/or stored onto memory (111b). Computer processor unit (111a) also provides on-site data reduction and analysis through designed software that allows for visual and audible characterizations of the measured responses on display (111c). The remote receiver (109), the A-D converter (110) and the computer system (111) are connected to a second independent power source (112). The second power source (112) can operate utilizing an internal power supply such as batteries. Other sources of power adaptable to the display apparatus (103) are also within the scope of this invention. The exterior casing and housing for device (102) is as shown in FIG. (1a).

Figure 3:
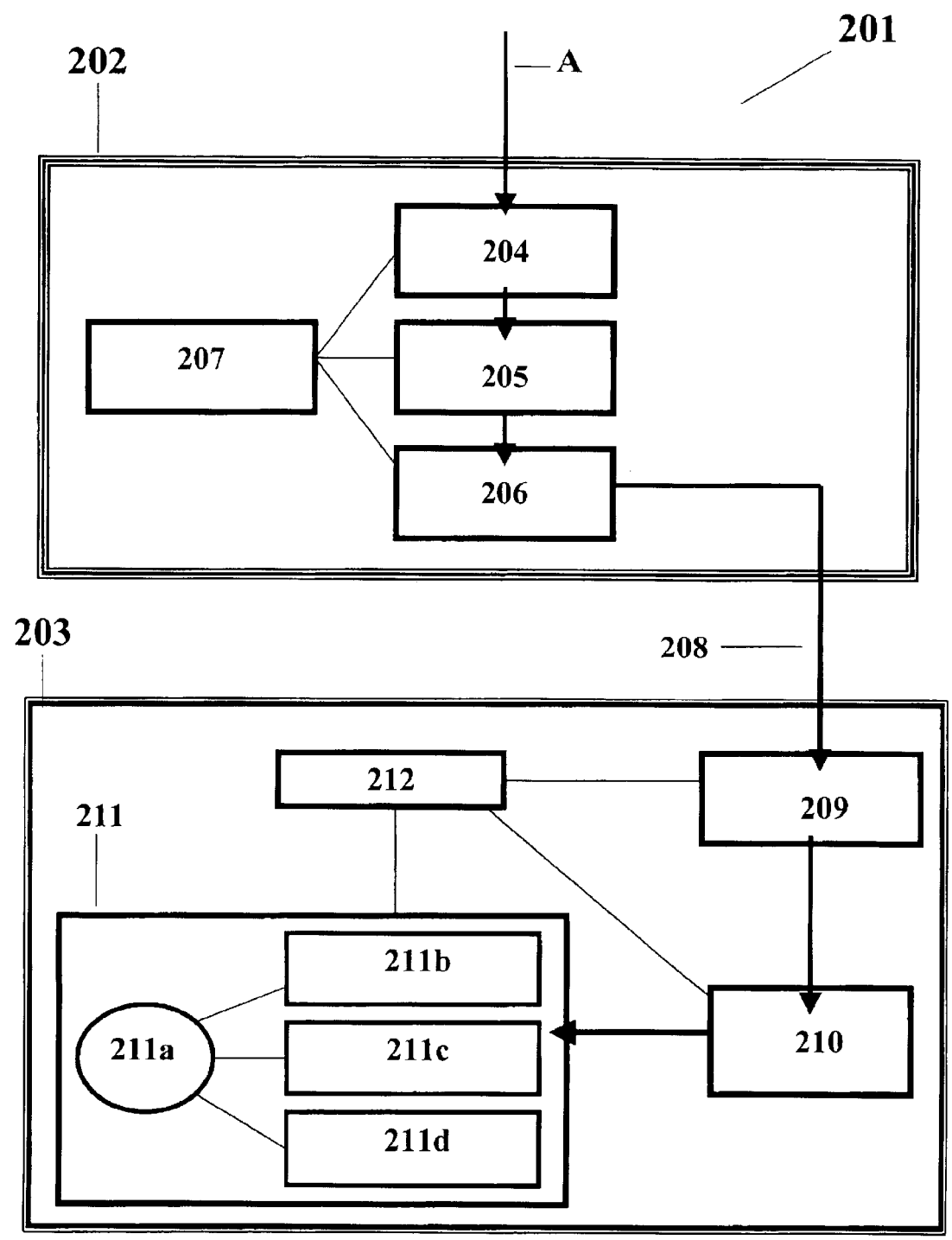
FIG. 3 shows am analog/internal power/wireless system of the present invention.

FIG. 3 shows another embodiment of the present invention. FIG. 3 of the present invention shows a wireless analog internal power system. System (201) of FIG. 3 provides a lightweight, portable device (202) and a display apparatus (203) that are utilized to detect and monitor collapse conditions at the time of fire or damage. The device (202) of the system (201) includes at least one accelerometer (204) as a transducer for monitoring structural responses. Accelerometer (204) must be capable of monitoring acceleration in one to three axial directions (i.e., x, y or z axis), preferably oriented perpendicular to a mounting surface, and operates in the range of 0–30 Hz. Accelerometer (204) monitors responses down to DC or zero Hz. This is because accelerometer (204) tracks very low frequency responses corresponding to the changing mean accelerations in the structures. Accelerometers that are not capable of monitoring DC responses will filter or attenuate these responses around 4 Hz, and, therefore, be incapable of detecting changing mean accelerations approaching ultimate collapse. The device (202) also includes a low pass filter and amplifier (205) that is-connected to the accelerometer (204) for signal gains equal to 100 over a 0–30 Hz range.

Device (202) also includes at least one transmitter (206) that is connected to the filter and amplifier (205). Bandwidth capabilities of the transmitter (206) shall be specified by the requirements imposed by environmental conditions and the highest desired frequency content in the signal.

The device (202) also includes an independent first power source (207) that is connected to the accelerometer (204), the filter and amplifier (205) and the transmitter (206). The first independent power source (207) includes batteries. However, other sources of power adaptable to the device (202) are also within the scope of this invention.

Transmitter (206) transfers analog response signals obtained from device (202) to the display apparatus (203)

through a wireless communication line (208). This analog signal is received by a remote receiver (209). The analog signal is then transferred to an A-D converter (210). The A-D converter (210) then transfers the digitized signal to a computer system (211). The computer system (211) includes a computer processing unit (211a), a memory (211b), a display screen (211c) and a user input (211d). The computer processor unit (211a) compares threshold values relating the acceleration responses to structural conditions. Based on these values, computer processor unit (211a) provides a signal to device (202) that is displayed on the on/off indicator (13b) as shown in FIG. 1(a). The digitized signals can be displayed on display screen (211c) and/or stored onto memory (211b). Computer processor unit (211a) also provides on-site data reduction and analysis through designed software that allows for visual and audible characterizations of the measured responses on display (211c). The remote receiver (209), the A-D converter (210) and the computer system (211) are connected to a second independent power source (212). The second power source (212) can operate utilizing an internal power supply such as batteries. Other sources of power adaptable to the display apparatus (203) are also within the scope of this invention. The exterior casing and housing for device (202) is as shown in FIG. (1a).

Figure 4:
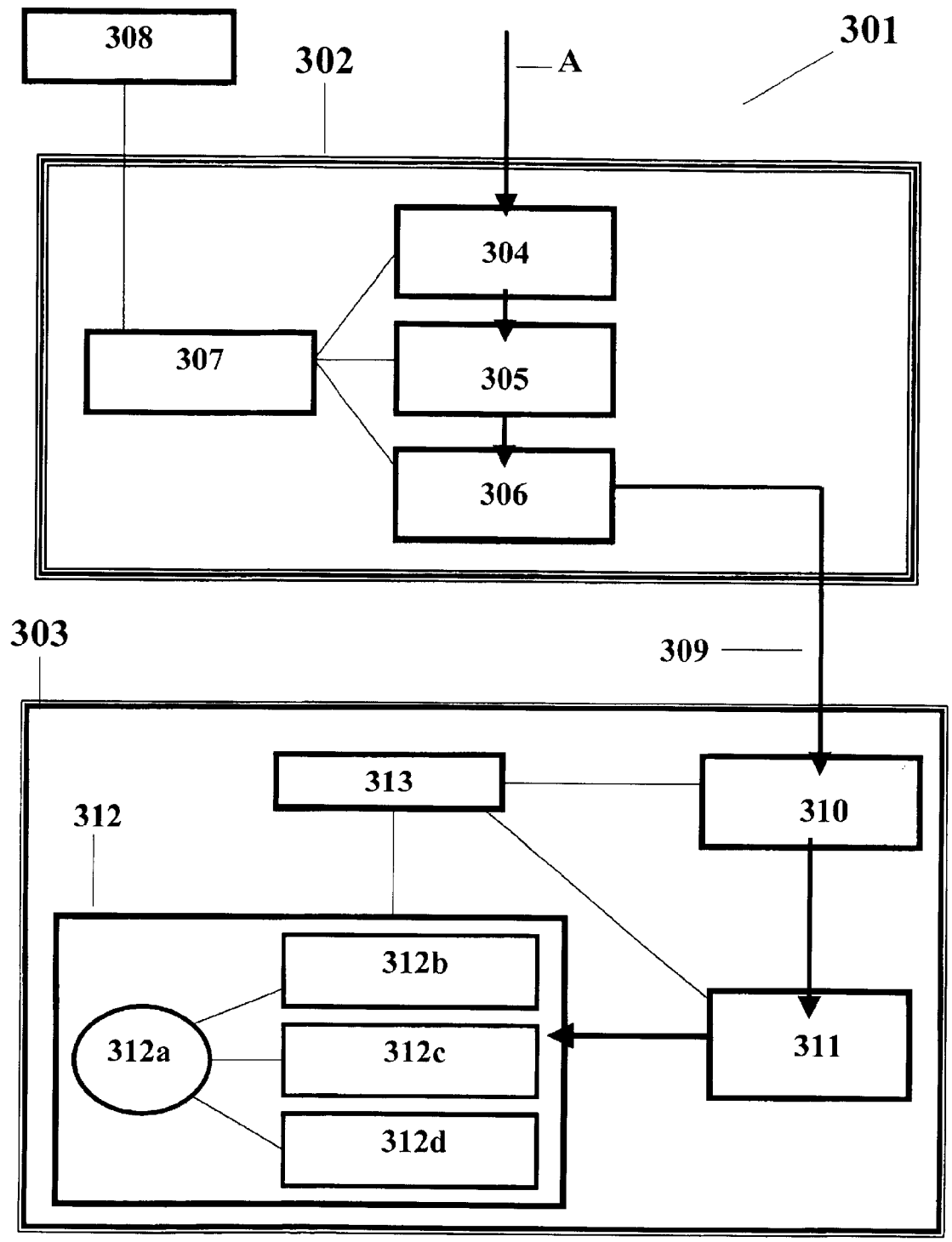
FIG. 4 shows an analog/building power/wired system of the present invention.

FIG. 4 depicts another embodiment of the present invention. FIG. 4 shows a wired analog internal power system having an alternate power source. System (301), shown in FIG. 4, provides a lightweight, portable device (302) and a display apparatus (303) that are utilized to detect and monitor collapse conditions at the time of fire or damage. The device (302) of the system (301) includes at least one accelerometer (304) as a transducer for monitoring structural responses. Accelerometer (304) must be capable of monitoring acceleration in one to three axial directions (i.e., x, y or z axis), preferably oriented perpendicular to a mounting surface, and operates in the range of 0–30 Hz. Accelerometer (304) monitors responses down to DC or zero Hz. This is because accelerometer (304) tracks very low frequency responses corresponding to the changing mean accelerations in the structures. Accelerometers that are not capable of monitoring DC responses will filter or attenuate these responses around 4 Hz, and, therefore, be incapable of detecting changing mean accelerations approaching ultimate collapse. The device (302) also includes a low pass filter and amplifier (305) that is connected to the accelerometer (304) for signal gains equal to 100 over a 0–30 Hz range.

Device (302) also includes at least one transmitter (306) that is connected to the filter and amplifier (305). Bandwidth capabilities of the transmitter (306) shall be specified by the requirements imposed by environmental conditions and the highest desired frequency content in the signal.

The device (302) also includes a first power source (307) that is connected to the accelerometer (304), the filter and amplifier (305) and the transmitter (306). The first power source (307) is capable of operating independently, utilizing an independent power supply such as internal batteries. Alternatively, first power source (307) may also obtain power from the building power supply (308) onto which the device (302) is attached. However, other sources of power adaptable to the device (302) are also within the scope of this invention.

Transmitter (306) transfers analog response signals obtained from device (302) to the display apparatus (303) through a wired communication line (309). The wired communication line (309) is covered with a fire retardant/heat retardant material suitable for high temperatures. This analog signal is received by a remote receiver (310). The analog signal is then transferred to an A-D converter (311). The A-D converter (311) then transfers the digitized signal to a computer system (312). The computer system (312) includes a computer processor unit (312a), a memory (312b), a display screen (312c) and a user input (312d). The computer processor unit (312a) compares threshold values relating the acceleration responses to structural conditions. Based on these values, computer processor unit (312a) provides a signal to device (302) that is displayed on the on/off indicator (13b) as shown in FIG. 1(a). The digitized signals can be displayed on display screen (312c) and/or stored onto memory (312b). Computer processor unit (312a) also provides on-site data reduction and analysis through designed software that allows for visual and audible characterizations of the measured responses on display (312c). The remote receiver (310), the A-D converter (311) and the computer system (312) are connected to a second power source (313). The second power source (313) can operate utilizing an internal power supply such as batteries. Other sources of power adaptable to the display apparatus (303) are also within the scope of this invention. The exterior casing and housing for device (302) is as shown in FIG. (1a).

Figure 5:
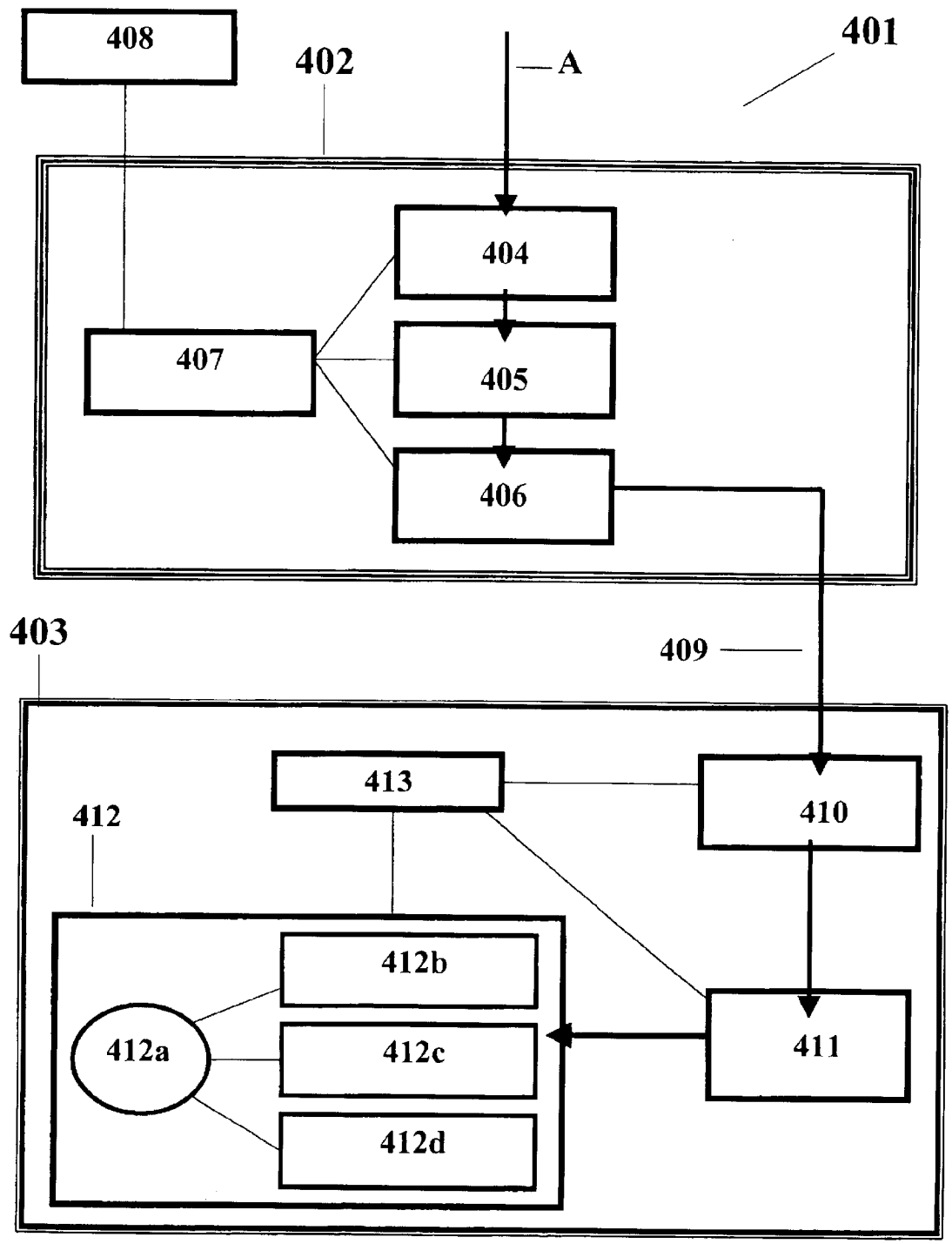
FIG. 5 shows an analog/building power/wireless system of the present invention.

FIG. 5 depicts a wireless analog internal power system having an alternate power source. System (401), shown in FIG. 5, provides a lightweight, portable device (402) and a display apparatus (403) that are utilized to detect and monitor collapse conditions at the time of fire or damage. The device (402) of the system (401) includes at least one accelerometer (404) as a transducer for monitoring structural responses. Accelerometer (404) must be capable of monitoring acceleration in one to three axial directions (i.e., x, y or z axis), preferably oriented perpendicular to a mounting surface, and operates in the range of 0–30 Hz. Accelerometer (404) monitors responses down to DC or zero Hz. This is because accelerometer (404) tracks very low frequency responses corresponding to the changing mean accelerations in the structures. Accelerometers that are not capable of monitoring DC responses will filter or attenuate these responses around 4 Hz, and, therefore, be incapable of detecting changing mean accelerations approaching ultimate collapse. The device (402) also includes a low pass filter and amplifier (405) that is connected to the accelerometer (404) for signal gains equal to 100 over a 0–30 Hz range.

Device (402) also includes at least one transmitter (406) that is connected to the filter and amplifier (405). Bandwidth capabilities of the transmitter (406) shall be specified by the requirements imposed by environmental conditions and the highest desired frequency content in the signal.

The device (402) also includes a first power source (407) that is connected to the accelerometer (404), the filter and amplifier (405) and the transmitter (406). The first power source (407) is capable of operating independently, utilizing an independent power supply such as internal batteries. Alternatively, first power source (407) may also obtain power from the building power supply (408) onto which the device (402) is attached. However, other sources of power adaptable to the device (402) are also within the scope of this invention.

Transmitter (406) transfers analog response signals obtained from device (402) to the display apparatus (403) through a wireless communication line (409). This analog signal is received by a remote receiver (410). The analog signal is then transferred to an A-D converter (411). The A-D converter (411) then transfers the digitized signal to a computer processor system (412). The computer system (412) includes a computer processor unit (412a), a memory (412b), a display screen (412c) and a user input (412d). The computer processor unit (412a) compares threshold values relating the acceleration responses to structural conditions. Based on these values, computer processor unit (412a) provides a signal to device (402) that is displayed on the on/off indicator (13b) as shown in FIG. 1(a). The digitized signals can be displayed on display screen (412c) and/or stored onto memory (412b). Computer processor unit (412a) also provides on-site data reduction and analysis through designed software that allows for visual and audible characterizations of the measured responses on display (412c). The remote receiver (410), the A-D converter (411) and the computer system (412) are connected to a second power source (413). The second power source (413) can operate utilizing an internal power supply such as batteries. Other sources of power adaptable to the display apparatus (403) are also within the scope of this invention. The exterior casing and housing for device (402) is as shown in FIG. (1a).

Figure 6:
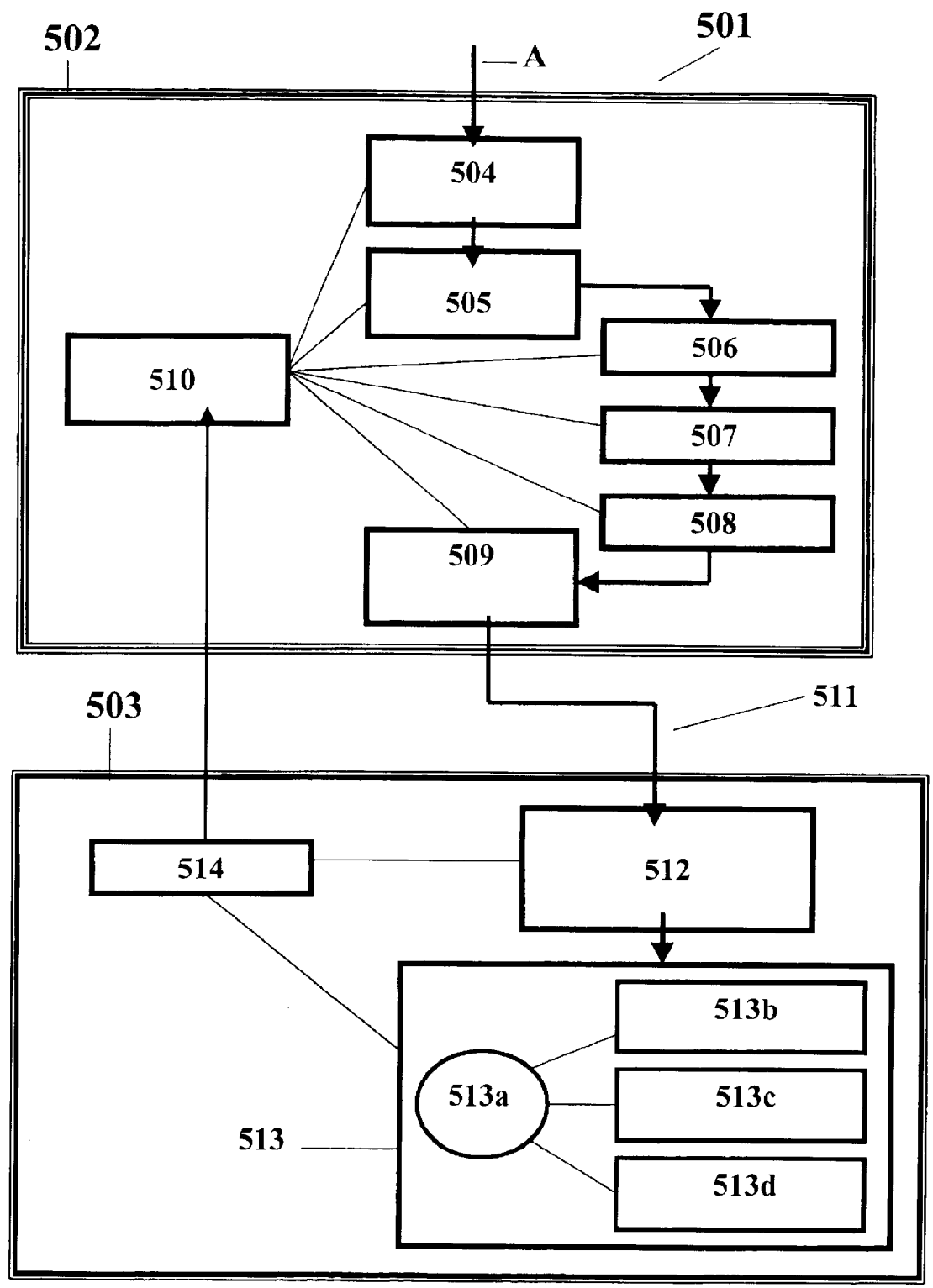
FIG. 6 shows a digital/through cable/wired system of the present invention.

FIG. 6 depicts a wired digital through cable system. System (501), shown in FIG. 6, provides a lightweight, portable device (502) and a display apparatus (503) that are utilized to detect and monitor collapse conditions at the time of fire or damage. The device (502) of the system (501) includes at least one accelerometer (504) as a transducer for monitoring structural responses. Accelerometer (504) must be capable of monitoring acceleration in one to three axial directions (i.e., x, y or z axis), preferably oriented perpendicular to a mounting surface, and operates in the range of 0–30 Hz. Accelerometer (504) monitors responses down to DC or zero Hz. This is because accelerometer (504) tracks very low frequency responses corresponding to the changing mean accelerations in the structures. Accelerometers that are not capable of monitoring DC responses will filter or attenuate these responses around 4 Hz, and, therefore, be incapable of detecting changing mean accelerations approaching ultimate collapse. The device (502) also includes a low pass filter and amplifier (505) that is connected to the accelerometer (504) for signal gains equal to 100 over a 0–30 Hz range. An A-D converter (506) is connected to the filter and amplifier (505) to convert the incoming analog signal into a digital one. This signal is processed in signal processor (507) and passed onto identifier (508). The identifier (508) stamps the data as specific to the device (502) of the system (501).

Device (502) also includes at least one transmitter (509) that is connected to the identifier (508). Bandwidth capabilities of the transmitter (509) shall be specified by the requirements imposed by environmental conditions and the highest desired frequency content in the signal.

The device (502) also includes a first power source (510) that is connected to the accelerometer (504), the filter and amplifier (505), the A-D converter (506), the processor (507), the identifier (508) and the transmitter (509). The first power source (510) is capable of operating independently, utilizing an independent power supply such as internal batteries. The first power source (510) may also obtain power from an alternate power supply as described herein below. Other sources of power adaptable to the device (402) are also within the scope of this invention.

Transmitter (509) transfers analog response signals obtained from device (502) to the display apparatus (503) through a wired communication line (511). The wired communication line (511) is covered with a fire retardant/heat retardant material suitable for high temperatures. This signal is received by a remote receiver (512). The remote receiver (512) transfers the digitized signal to a computer system (513). The computer system (513) includes a computer processor unit (513a), a memory (513b), a display screen (513c) and a user input (513d). The computer processor unit (513a) compares threshold values relating the acceleration responses to structural conditions. Based on these values, computer processor unit (513a) provides a signal to device (502) that is displayed on the on/off indicator (13b) as shown in FIG. 1(a). The digitized signals can be displayed on display screen (513c) and/or stored onto memory (513b). Computer processor unit (513a) also provides on-site data reduction and analysis through designed software that allows for visual and audible characterizations of the measured responses on display (513c). The remote receiver (512) and the computer system (513) are connected to a second power source (514). The second power source (514) is also capable of providing power to the first power source (510) of the device (502). The second power source (514) can operate utilizing an internal power supply such as batteries. Other sources of power adaptable to the display apparatus (503) are also within the scope of this invention. The exterior casing and housing for device (502) is as shown in FIG. (1a).

Figure 7:
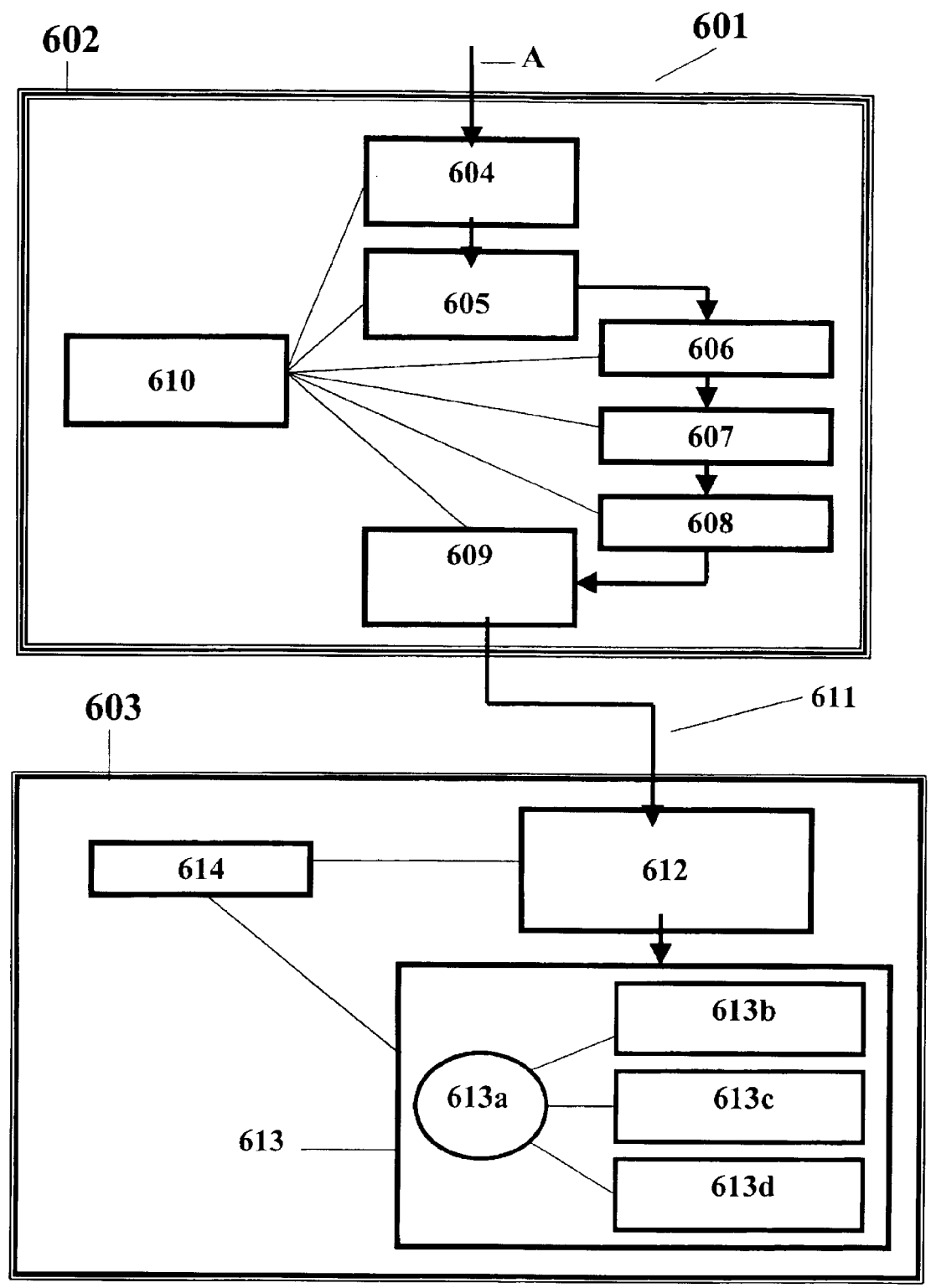
FIG. 7 shows a digital/internal power/wired system of the present invention.

FIG. 7 shows another embodiment of a wired digital through cable system. The system (601), shown in FIG. 7, provides a lightweight, portable device (602) and a display apparatus (603) that are utilized to detect and monitor collapse conditions at the time of fire or damage. The device (602) of the system (601) includes at least one accelerometer (604) as a transducer for monitoring structural responses. Accelerometer (604) must be capable of monitoring acceleration in one to three axial directions (i.e., x, y or z axis), preferably oriented perpendicular to a mounting surface, and operates in the range of 0–30 Hz. Accelerometer (604) monitors responses down to DC or zero Hz. This is because accelerometer (604) tracks very low frequency responses corresponding to the changing mean accelerations in the structures. Accelerometers that are not capable of monitoring DC responses will filter or attenuate these responses around 4 Hz, and, therefore, be incapable of detecting changing mean accelerations approaching ultimate collapse. The device (602) also includes a low pass filter and amplifier (605) that is connected to the accelerometer (604) for signal gains equal to 100 over a 0–30 Hz range. An A-D converter (606) is connected to the filter and amplifier (605) to convert the incoming analog signal into a digital one. This signal is processed in signal processor (607) and passed onto identifier (608).

Device (602) also includes at least one transmitter (609) that is connected to the identifier (608). Bandwidth capabilities of the transmitter (609) shall be specified by the requirements imposed by environmental conditions and the highest desired frequency content in the signal.

The device (602) also includes a first power source (610) that is connected to the accelerometer (604), the filter and amplifier (605), the A-D converter (606), the processor (607), the identifier (608) and the transmitter (609). The first power source (610) is capable of operating independently, utilizing an independent power supply such as internal batteries. Other sources of power adaptable to the device (402) are also within the scope of this invention.

Transmitter (609) transfers analog response signals obtained from device (602) to the display apparatus (603) through a wired communication line (611). The wired communication line (611) is covered with a fire retardant/heat retardant material suitable for high temperatures. This signal is received by a remote receiver (612). The remote receiver (612) transfers the digitized signal to a computer processor unit (613). The computer system (613) includes a computer processor unit (613a), a memory (613b), a display screen (613c) and a user input (613d). The computer processor unit (613a) compares threshold values relating the acceleration responses to structural conditions. Based on these values, computer processor unit (613a) provides a signal to device (602) that is displayed on the on/off indicator (13b) as shown in FIG. 1(a). The digitized signals can be displayed on display screen (613c) and/or stored onto memory (613b). Computer processor unit (613a) also provides on-site data reduction and analysis through designed software that allows for visual and audible characterizations of the measured responses on display (613c). The remote receiver (612) and the computer system (613) are connected to a second power source (614). The second power source (614) can operate utilizing an internal power supply such as batteries. Other sources of power adaptable to the display apparatus (603) are also within the scope of this invention. The exterior casing and housing for device (602) is as shown in FIG. (1a).

Figure 8:
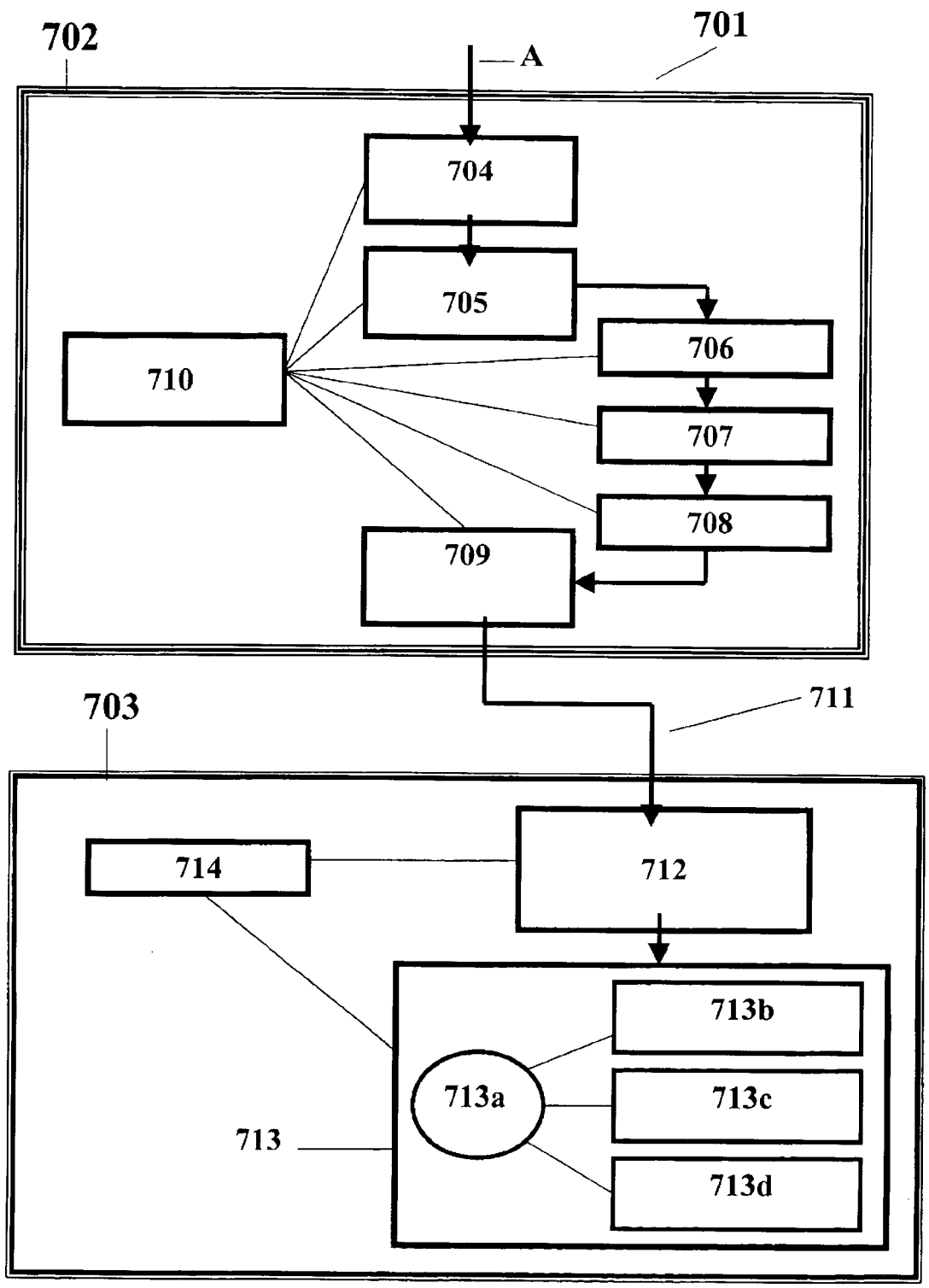
FIG. 8 shows a digital/internal power/wireless system of the present invention.

FIG. 8 shows another embodiment of a wired digital through cable system. The system (701), shown in FIG. 8, provides a lightweight, portable device (702) and a display apparatus (703) that are utilized to detect and monitor collapse conditions at the time of fire or damage. The device (702) of the system (701) includes at least one accelerometer (704) as a transducer for monitoring structural responses. Accelerometer (704) must be capable of monitoring acceleration in one to three axial directions (i.e., x, y or z axis), preferably oriented perpendicular to a mounting surface, and operates in the range of 0–30 Hz. Accelerometer (704) monitors responses down to DC or zero Hz. This is because accelerometer (704) tracks very low frequency responses corresponding to the changing mean accelerations in the structures. Accelerometers that are not capable of monitoring DC responses will filter or attenuate these responses around 4 Hz, and, therefore, be incapable of detecting changing mean accelerations approaching ultimate collapse. The device (702) also includes a low pass filter and amplifier (705) that is connected to the accelerometer (704) for signal gains equal to 100 over a 0–30 Hz range. An A-D converter (706) is connected to the filter and amplifier (705) to convert the incoming analog signal into a digital one. This signal is processed in signal processor (707) and passed onto identifier (708).

Device (702) also includes at least one transmitter (709) that is connected to the identifier (708). Bandwidth capabilities of the transmitter (709) shall be specified by the requirements imposed by environmental conditions and the highest desired frequency content in the signal.

The device (702) also includes a first power source (710) that is connected to the accelerometer (704), the filter and amplifier (705), the A-D converter (706), the processor (707), the identifier (708) and the transmitter (709). The first power source (710) is capable of operating independently, utilizing an independent power supply such as internal batteries. Other sources of power adaptable to the device (702) are also within the scope of this invention.

Transmitter (709) transfers analog response signals obtained from device (702) to the display apparatus (703) through a wireless communication line (711). This signal is received by a remote receiver (712). The remote receiver (712) transfers the digitized signal to a computer processor unit (713). The computer system (713) includes a computer processor unit (713a), a memory (713b), a display screen (713c) and a user input (713d). The computer processor unit (713a) compares threshold values relating the acceleration responses to structural conditions. Based on these values, computer processor unit (713a) provides a signal to device (702) that is displayed on the on/off indicator (13b) as shown in FIG. 1(a). The digitized signals can be displayed on display screen (713c) and/or stored onto memory (713b). Computer processor unit (713a) also provides on-site data reduction and analysis through designed software that allows for visual and audible characterizations of the measured responses on display (713c). The remote receiver (712) and the computer system (713) are connected to a second power source (714). The second power source (714) can operate utilizing an internal power supply such as batteries. Other sources of power adaptable to the display apparatus (703) are also within the scope of this invention. The exterior casing and housing for device (702) is as shown in FIG. (1a).

Figure 9:
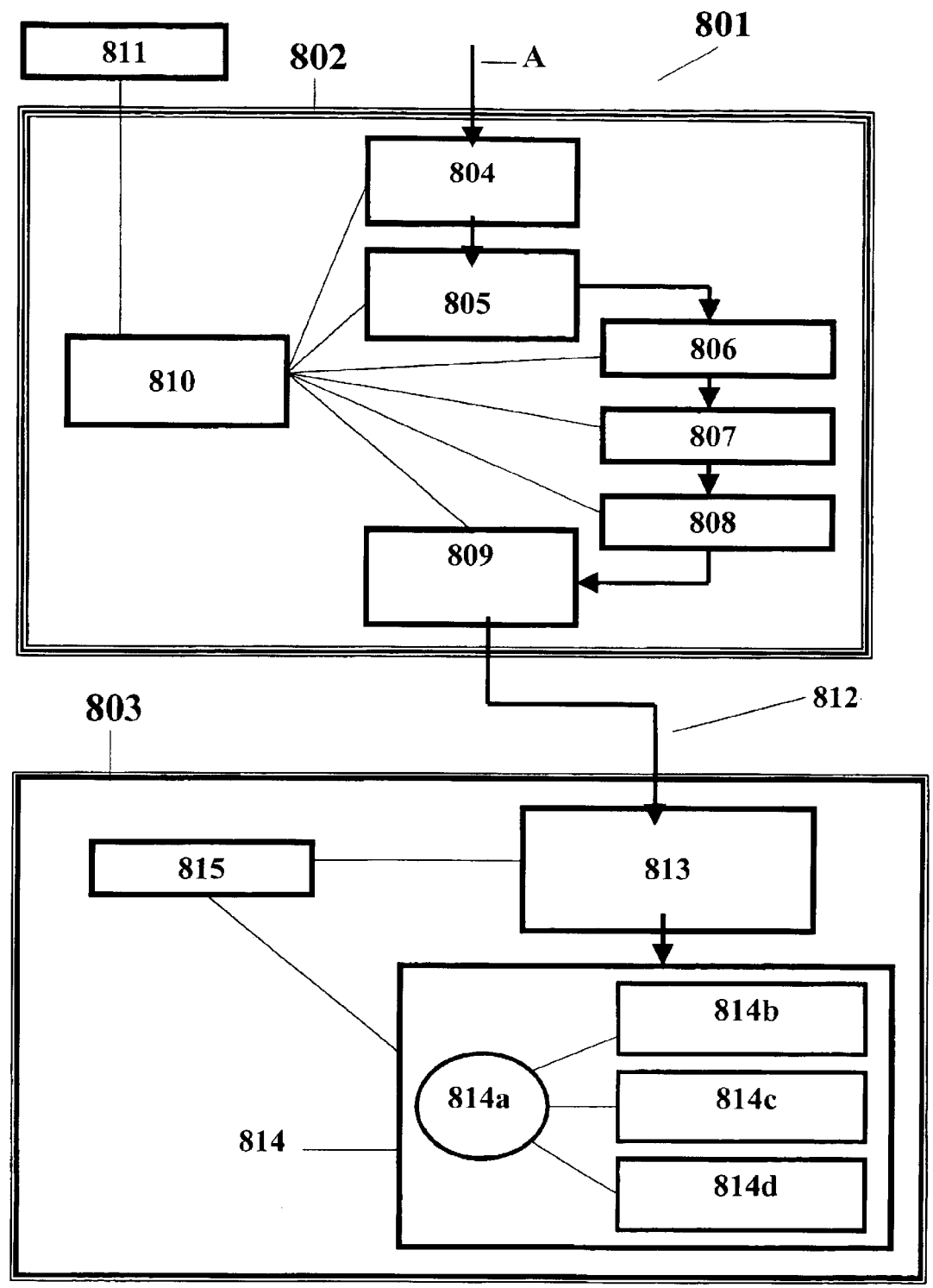
FIG. 9 shows a digital/building power/wired system of the present invention.

FIG. 9 shows another embodiment of a wired digital through cable system. The system (801), shown in FIG. 9, provides a lightweight, portable device (802) and a display apparatus (803) that are utilized to detect and monitor collapse conditions at the time of fire or damage. The device (802) of the system (801) includes at least one accelerometer (804) as a transducer for monitoring structural responses. Accelerometer (804) must be capable of monitoring acceleration in one to three axial directions (i.e., x, y or z axis), preferably oriented perpendicular to a mounting surface, and operates in the range of 0–30 Hz. Accelerometer (804) monitors responses down to DC or zero Hz. This is because accelerometer (804) tracks very low frequency responses corresponding to the changing mean accelerations in the structures. Accelerometers that are not capable of monitoring DC responses will filter or attenuate these responses around 4 Hz, and, therefore, be incapable of detecting changing mean accelerations approaching ultimate collapse. The device (802) also includes a low pass filter and amplifier (805) that is connected to the accelerometer (804) for signal gains equal to 100 over a 0–30 Hz range. An A-D converter (806) is connected to the filter and amplifier (805) to convert the incoming analog signal into a digital one. This signal is processed in signal processor (807) and passed onto identifier (808).

Device (802) also includes at least one transmitter (809) that is connected to the identifier (808). Bandwidth capabilities of the transmitter (809) shall be specified by the requirements imposed by environmental conditions and the highest desired frequency content in the signal.

The device (802) also includes a first power source (810) that is connected to the accelerometer (804), the filter and amplifier (805), the A-D converter (806), the processor (807), the identifier (808) and the transmitter (809). The first power source (810) is capable of operating independently, utilizing an independent power supply such as internal batteries. Alternatively, the first power source (810) can also utilize power obtained from a building power supply (811) onto which the device (802) is attached. Other sources of power adaptable to the device (802) are also within the scope of this invention.

Transmitter (809) transfers analog response signals obtained from device (802) to the display apparatus (803) through a wired communication line (812). The wired communication line (812) is covered with a fire retardant/heat retardant material suitable for high temperatures. This signal is received by a remote receiver (813). The remote receiver (813) transfers the digitized signal to a computer system (814). The computer system (814) includes a computer processor unit (814a), a memory (814b), a display screen (814c) and a user input (814d). The computer processor unit (814a) compares threshold values relating the acceleration responses to structural conditions. Based on these values, computer processor unit (814a) provides a signal to device (802) that is displayed on the on/off indicator (13b) as shown in FIG. 1(a). The digitized signals can be displayed on display screen (814c) and/or stored onto memory (814b). Computer processor unit (814a) also provides on-site data reduction and analysis through designed software that allows for visual and audible characterizations of the measured responses on display (814c). The remote receiver (813) and the computer system (814) are connected to a second power source (815). The second power source (815) can operate utilizing an internal power supply such as batteries. Other sources of power adaptable to the display apparatus (803) are also within the scope of this invention. The exterior casing and housing for device (802) is as shown in FIG. (1a).

Figure 10:
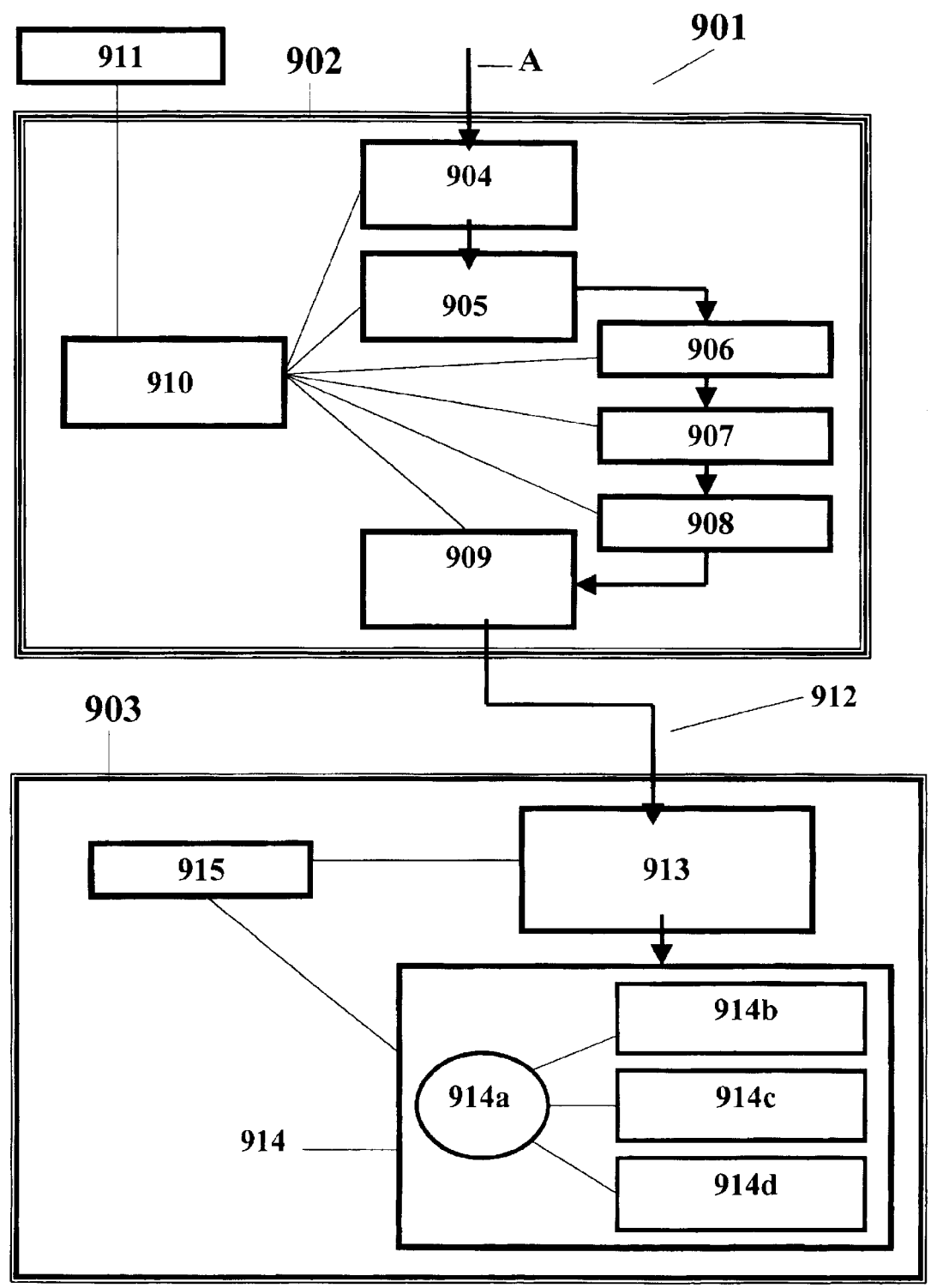
FIG. 10 shows a digital/building power/wireless system of the present invention.

FIG. 10 shows another embodiment of a wired digital through cable system. The system (901), shown in FIG. 10, provides a lightweight, portable device (902) and a display apparatus (903) that are utilized to detect and monitor collapse conditions at the time of fire or damage. The device (902) of the system (901) includes at least one accelerometer (904) as a transducer for monitoring structural responses. Accelerometer (904) must be capable of monitoring acceleration in one to three axial directions (i.e., x, y or z axis), preferably oriented perpendicular to a mounting surface, and operates in the range of 0–30 Hz. Accelerometer (904) monitors responses down to DC or zero Hz. This is because accelerometer (904) tracks very low frequency responses corresponding to the changing mean accelerations in the structures. Accelerometers that are not capable of monitoring DC responses will filter or attenuate these responses around 4 Hz, and, therefore, be incapable of detecting changing mean accelerations approaching ultimate collapse. The device (902) also includes a low pass filter and amplifier (905) that is connected to the accelerometer (904) for signal gains equal to 100 over a 0–30 Hz range. An A-D converter (906) is connected to the filter and amplifier (905) to convert the incoming analog signal into a digital one. This signal is processed in signal processor (907) and passed onto identifier (908).

Device (902) also includes at least one transmitter (909) that is connected to the identifier (908). Bandwidth capabilities of the transmitter (909) shall be specified by the requirements imposed by environmental conditions and the highest desired frequency content in the signal.

The device (902) also includes a first power source (910) that is connected to the accelerometer (904), the filter and amplifier (905), the A-D converter (906), the processor (907), the identifier (908) and the transmitter (909). The first power source (910) is capable of operating independently, utilizing an independent power supply such as internal batteries. Alternatively, the first power source (910) can also utilize power obtained from a building power supply (911) onto which the device (902) is attached. Other sources of power adaptable to the device (902) are also within the scope of this invention.

Transmitter (909) transfers analog response signals obtained from device (902) to the display apparatus (903) through a wireless communication line (912). This signal is received by a remote receiver (913). The remote receiver (913) transfers the digitized signal to a computer system (914). The computer system (914) includes a computer processor unit (914a), a memory (914b), a display screen (914c) and a user input (914d). The computer processor unit (914a) compares threshold values relating the acceleration responses to structural conditions. Based on these values, computer processor unit (914a) provides a signal to device (902) that is displayed on the on/off indicator (13b) as shown in FIG. 1(a). The digitized signals can be displayed on display screen (914c) and/or stored onto memory (914a). Computer processor unit (914a) also provides on-site data reduction and analysis through designed software that allows for visual and audible characterizations of the measured responses on display (914c). The remote receiver (913) and the computer system (914) are connected to a second power source (915). The second power source (915) can operate utilizing an internal power supply such as batteries. Other sources of power adaptable to the display apparatus (903) are also within the scope of this invention. The exterior casing and housing for device (902) is as shown in FIG. (1a).

The systems of FIGS. 1 through 10 can be attached to the exterior of a structure (not shown) that is under burn or damage conditions and mounted to an exterior surface of the structure, using bolts or adhesives. The optimal mounting location is dependent upon the structure and accessibility by rescue workers. Placing device (2), (102), (202), (302), (402), (502), (602), (702), (802) or (902) at a truss support height or at a mid span height (the ceiling height midway between the supports) is sufficient. Generally speaking, this placement is at a location of 8 ft from the ground. Placement on a top portion of a beam or truss is generally impractical, and also detrimental to the device (2), (102), (202), (302), (402), (502), (602), (702), (802) or (902) as it exerts added thermal stress. It is also mounted in a manner such that it is used to monitor acceleration responses perpendicular to the surface that it is mounted. And in a manner that does not penetrate the wall through to the drywall and framing.

Once mounted, accelerometer (4), (104), (204), (304), (404), (504), (604), (704), (804), or (904) begins to monitor acceleration responses (A) emitting from the structure at time of burn, and continues to monitor acceleration responses through actual collapse to post collapse.

Multiple devices of (2), (102), (202), (302), (402), (502), (602), (702), (802) or (902) can be mounted in this fashion, so that a plurality of surfaces can be monitored. Alternatively, a single device (2), (102), (202), (302), (402), (502), (602), (702), (802) or (902) having multiple accelerometers (4), (104), (204), (304), (404), (504), (604), (704), (804), or (904) capable of monitoring and detecting acceleration responses in all directions (x-y-z axis) may be used. In yet another embodiment, a single device (2), (102), (202), (302), (402), (502), (602), (702), (802), or (902) having a single accelerometer (4), (104), (204), (304), (404), (504), (604), (704), (804), or (904) that monitors all three axes is also within the scope of the present invention.

The method and system discussed above, is not limited to detection at the time of collapse. Rather, the systems as shown in FIGS. 1 through 10 of the present invention can be installed at time of structure construction. When the system of the present invention is pre-mounted, data acquisition captures the ignition event and continues past the time of structure collapse. As a result, the data represent a complete sequence of events beginning prior to ignition, through ignition, structural response during burn, and actual collapse to post collapse response.

As stated above, data acquisition is event based, where a structure's current condition and state is assessed, recorded and used for real times structural evaluation. Evaluations are performed on the basis of the system's ability to detect low-level structural vibrations and to convert these vibrations into transient amplitude and decay rate characteristics.

Test Data:

A series of burn tests were conducted to determine collapse mechanism and to test the system and device of the present invention.

As shown through the test results identified in FIGS. 11 through 14 below, the system and method of the present invention detect vibration responses on the exterior of a structure so as to determine transient amplitude and decay characteristics. The system detects low-level vibrations that are converted into dominant transient signals indicating amplitude fluctuations as well as decay rates associated with system stability. Structural stability is characterized in terms of response amplitudes that decay sufficiently within fixed time intervals. Structural instability is characterized in terms of growing response amplitudes that do not decay within the fixed time intervals.

Figure 11:
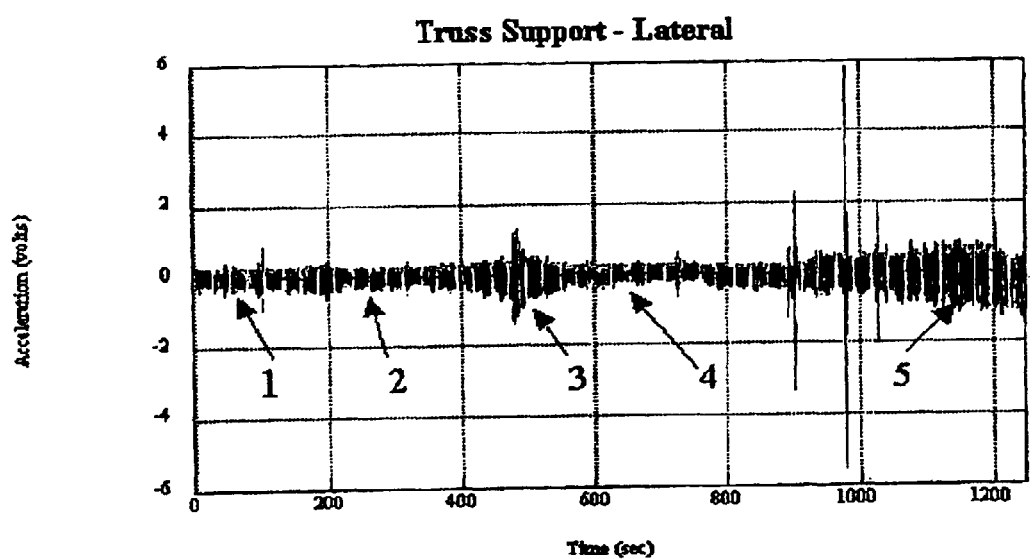
FIG. 11 is a graph showing the acceleration signal over time, obtained from the Phoenix, Ariz., burn test.

The Phoenix, Ariz. test:

A test burn of a truss support was conducted in Phoenix, Ariz. FIG. 11 shows a graph of the acceleration responses over real-time, during the burn. Phase 1 of the test was the pre-ignition event (occurring between 0–200 seconds). Phase 2 shows structural vibrations due to the fire (occurring between 200 and 400 seconds). Phase 3 is a transient response (occurring at approximately 500 seconds). Phase 4 shows structural vibrations due to the continued burn (occurring at approximately 700 seconds. Phase 5 shows the increasing structural response due to the fire compromising the structural integrity of the building.

Figure 12A:
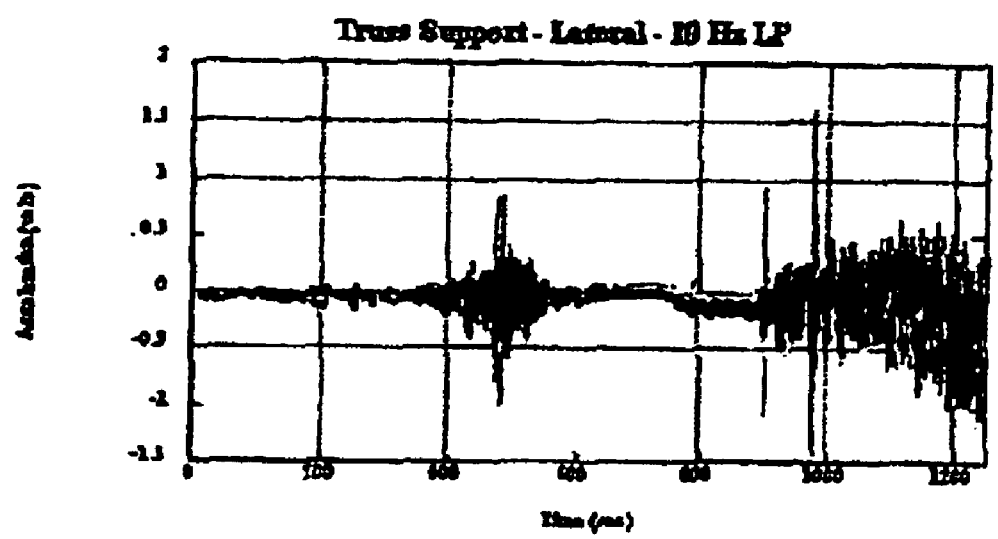
FIG. 12(a) is a graph showing the acceleration response corresponding to the acceleration signal from the Phoenix, Ariz., burn test.

FIG. 12(a) shows the acceleration response over time and corresponding to the graph shown in FIG. 11 and discussed above. The data points shown in FIG. 12(a) were taken from different locations of the burning structure utilizing a second device.

FIG. 12(a) shows transient characteristics that indicate structural stability. The structure exhibits a strong transient behavior that grows in amplitude, but that decays to pre-transient levels. Later in the time history, multiple transients are observed with growing amplitude and decay rates that do not allow a return to pre-transient levels. Collapse is indicated near the end of the record and coincides with the large transient near 1200 seconds.

Figure 12B:
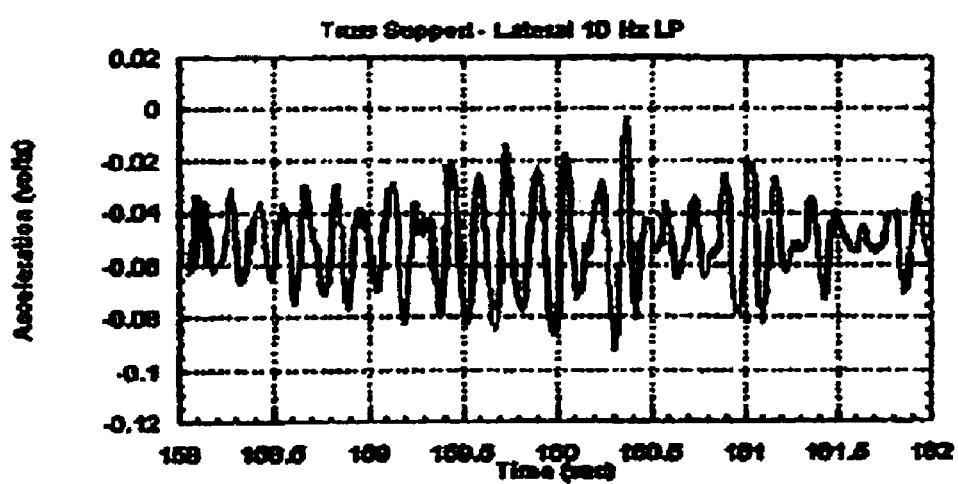
FIG. 12(b) is a filtered signal of the acceleration response over time, obtained from the Phoenix, Ariz., burn test.

FIG. 12(b) shows a graph of the data of FIG. 12(a) subsequent to filtering. The data obtained from the burn was filtered using a low pass filter to view a clean signal of the structural resonance, without ambient noise. FIG. 12(b) is an expanded view of a discrete time step within FIG. 12(a). This view shows the sinusoidal motions occurring within the structure.

The signal obtained shows the system of the present invention's ability to track transient conditions associated with structural stability. The signal is taken early during the burn test on the Phoenix, Ariz., structure and highlights the system's ability to sense growing transient amplitudes and the subsequent decay beyond 160.5 seconds. The ability of the system to provide this information allows a methodology based on tracking transient characteristics indicative of structural stability.

Figure 12C:
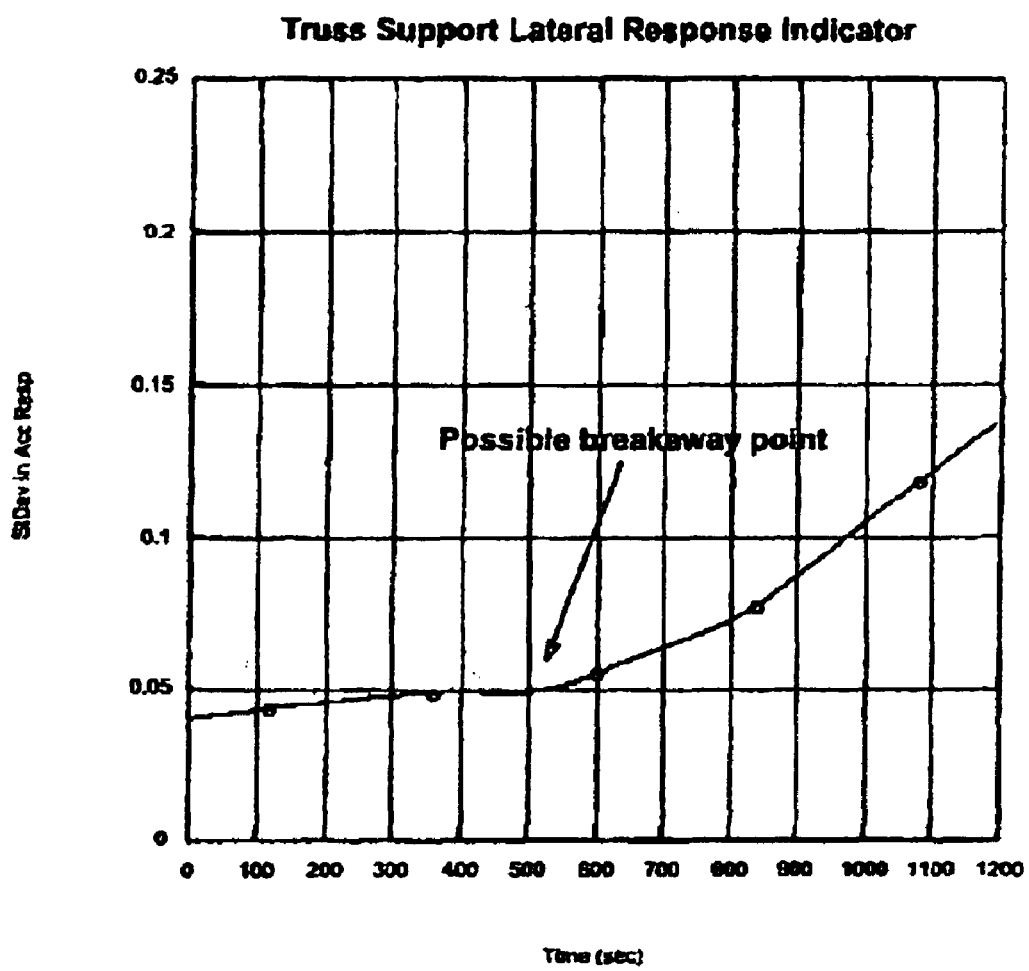
FIG. 12(c) is a graph indicating the breakaway point corresponding to weakened structural support, obtained from the Phoenix, Ariz., burn test.

FIG. 12(c) shows a curve indicating a distinctive break-away point that correlates to damage conditions, specifically, weakened structural support due to fire. The increasing trend beyond 600 seconds is irreversible. Since this point can be determined, this test provides proof that large increases or changes in acceleration, when detected early enough, as per the system and method of the present invention, will provide warning of impending collapse.

The Kingston, North Carolina test:

Five single story wood frame houses were burned through roof collapse. These structures were built according to post 1970 construction codes in the Kinston, N.C. area. These structures were restored in the aftermath of hurricanes in the region and were available to local fire fighting agencies for training exercises involving structural fires.

Three of the five houses were monitored for structural collapse. Due to the lightweight construction of these houses, the primary effect of the fire was to "eat away" at the roof and no real collapse mechanism was detected. Subsequently, a 250 gal capacity oil storage tank was placed on top of the roof of the last house. The storage tank was filled with water to provide an approximate load of 1200 lbs. and strapped onto the roof to ensure a collapse scenario.

Four devices as per the present invention were installed around the perimeter of the house. At each location, the device of the system was mounted at an 8 ft height onto the exterior brick surface. The device was mounted using bolts, and care was taken not to penetrate the wall through to the drywall and wood stud framing. The devices were oriented so that motion perpendicular to the wall could be monitored. The building was then set on fire.

Data acquisition began prior to ignition and continued past the time of roof collapse. As a result, the data represents a complete sequence of events prior to ignition, ignition, structural response during burn, actual roof collapse and post collapse response. Digital images and video images were also taken to establish a time sequence. The occurrence of the collapse is substantiated by the video time sequence. All four of the devices survived the burn and the data presented in FIG. 13 was taken from one of the devices.

Figure 13:
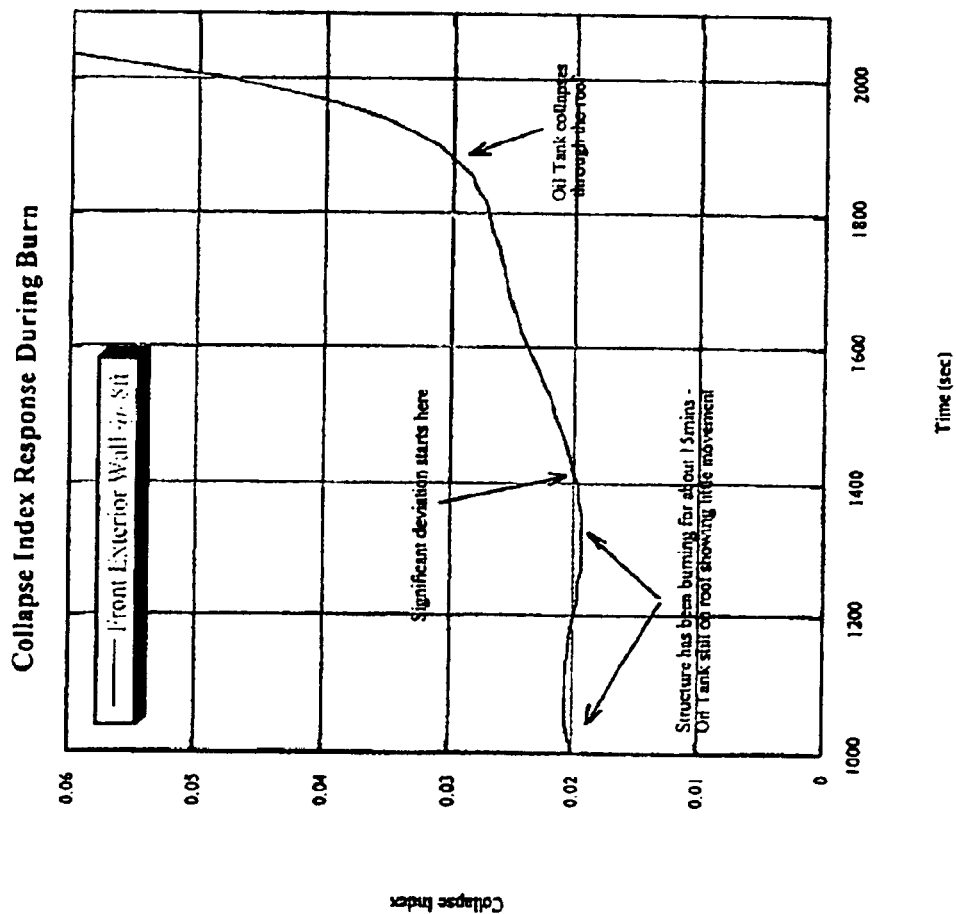
FIG. 13 shows the collapse index corresponding to the measured acceleration responses over time obtained from the Kingston, N.C., burn test.

FIG. 13 shows transient amplitude based collapse index for a single family home. Baseline information is the basis for comparisons below 1400 seconds over which no significant variation in structural stability is observed. Beyond 1400 seconds, rapid changes in transient amplitudes and the growing decay rates result in large variations from baseline leading to ultimate collapse.

Figure 14:
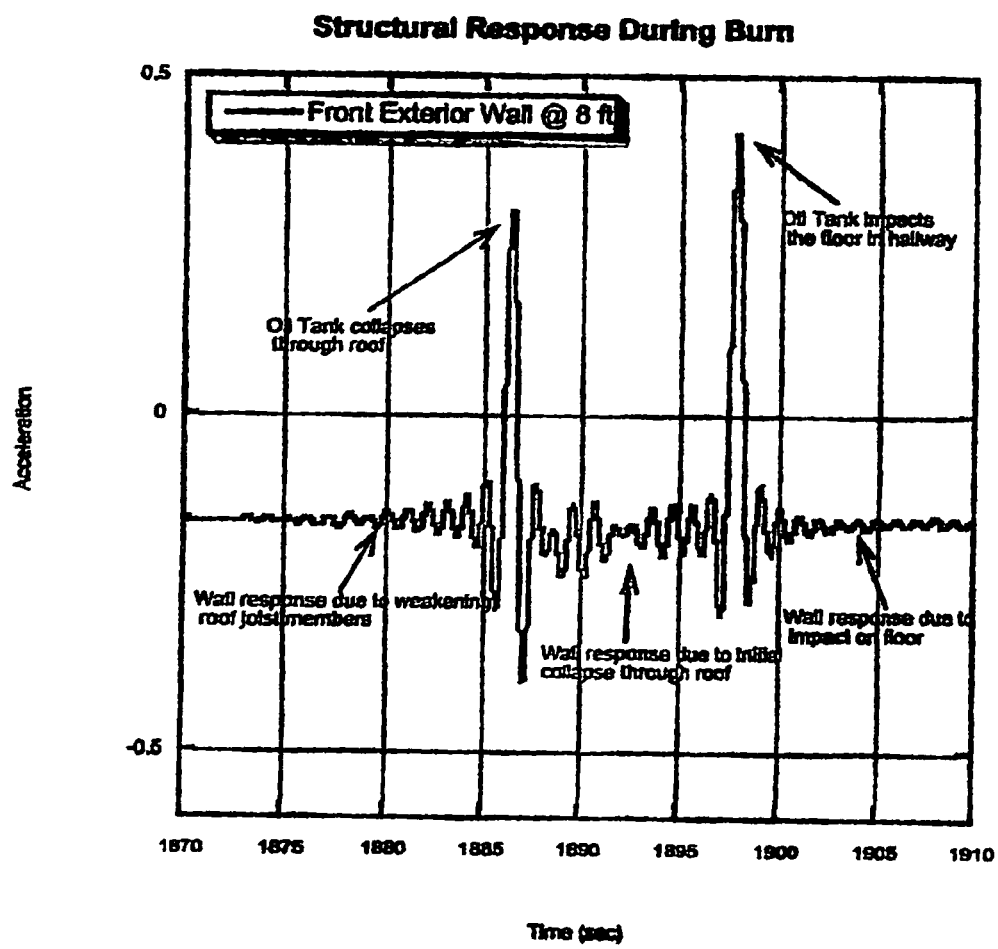
FIG. 14 is a graph showing measured acceleration response from test data obtained from the Kingston, N.C., burn test.

FIG. 14 is a graph showing measured acceleration response time at the time of roof collapse. The response is a snap shot of changing transient characteristics leading to global structural collapse during the burn test on a single family home. Wall response due to weakening roof joist members begins prior to 1880 seconds. The first peak occurs at approximately 1886 seconds, followed by increased dynamic sinusoidal response. Another peak occurs around 1898 seconds followed by another set of dynamic sinusoidal responses (around 1900 seconds). The first peak corresponds to the oil tank collapsing through the roof, while the second spike corresponds to impact of the tank on the hallway floor. The first set of sinusoidal responses are associated with the movement monitored on the exterior wall in the seconds leading up to collapse due to weakening roof joists, followed by the wall response as the tank is falling through the roof. The second set of sinusoidal responses is due to the tank impact on the hallway floor.

What is claimed is:

1. A system for detecting collapse of structures comprising:
    a device for detecting vibration responses on exterior of said structure said device constructed so as to determine transient amplitude and decay characteristics of said structure said transient amplitude and decay characteristics indicative of collapse of said structure in real time;
    said device including at least one accelerometer, said accelerometer constructed so as to receive acceleration responses from a structure in real time and in at least one axial direction;
    said device including a filter and amplifier, said filter and amplifier constructed so as to connect to said accelerometer, said filter and amplifier further constructed so as to receive said real time acceleration responses, remove extraneous noise from said acceleration responses and amplify said acceleration responses;

said device including at least one transmitter, said transmitter constructed so as to connect to said filter and amplifier, said transmitter further constructed so as to receive said filtered and amplified real time acceleration responses, said transmitter further constructed so as to convert said real time acceleration responses to an analog signal and transmit said signal; and said device including a first power source connected to said accelerometer, said filter and amplifier and said transmitter, said first power source constructed so as supply power to said accelerometer, said filter and amplifier and said transmitter, said first power source further constructed so as to obtain power from dependent and independent power supplies.

2. A system for detecting collapse of structures as recited in claim 1 wherein said accelerometer having a reading range of 0 to 30 Hz.

3. A system for detecting collapse of structures as recited in claim 2 wherein said independent power source comprises internal batteries.

4. A system for detecting collapse of structures as recited in claim 3, wherein said device further comprises an external thermal casing, said casing constructed so as to protect said device from heat damages at temperatures up to 1900° F., said casing further constructed so as to be waterproof.

5. A system for detecting collapse of structures as recited in claim 4, wherein said casing comprises a face plate having an on-off indicator and an attachment means for attaching said device onto said structure.

6. A system for detecting collapse of structures as recited in claim 5, wherein said on-off indicator is selected from a group consisting of a switch mechanism, an audio signal indicator and a visual signal indicator.

7. A system for detecting collapse of structures as recited in claim 6, wherein said attachment means comprises adhesives and bolts.

8. A system for detecting collapse of structures comprising:

a display apparatus including a remote receiver constructed so as to receive real time analog signals and transmit said analog signals;

said display apparatus including an analog to digital converter being connected to said remote receiver, said converter constructed so as receive said analog signals and further constructed to convert said real time analog signals to real time digital signals;

said display apparatus including a computer, said computer being connected to said converter and constructed so as to receive said real time digital signals, compare stored threshold data with said real time digital signal and obtain a resultant value; and said display apparatus further including a second power source constructed so as to supply power to said remote receiver, said analog to digital converter and said computer, said second power source further constructed so as to obtain power from a power supply.

9. A system for detecting collapse of structures as recited in claim 8 wherein said computer further comprises a central processing unit constructed so as to track said transient amplitude and decay characteristics indicative of structural collapse and provide on-site data reduction and analysis, said central processing unit connected to a memory unit, said central processing unit further connected to a display unit, said display unit constructed so as to display a collapse mechanism in real time, said central processing unit further connected to an user input.

10. A system for detecting collapse of structures as recited in claim 9 wherein said power supply comprises batteries, AC sources and DC sources.

11. A system for detecting collapse of structures comprising:

a device for detecting vibration responses on exterior of said structure said device constructed so as to determine transient amplitude and decay characteristics of said structure, said transient amplitude and decay characteristics indicative of collapse of said structure in real time;

said device including at least one accelerometer, said accelerometer constructed so as to receive acceleration responses from a structure in real time and in at least one axial direction;

said device including a filter and amplifier, said filter and amplifier constructed so as to connect to said accelerometer, said filter and amplifier further constructed so as to receive said real time acceleration responses, remove extraneous noise from said acceleration responses and amplify said acceleration responses;

said device including at least one transmitter, said transmitter constructed so as to connect to said filter and amplifier, said transmitter further constructed so as to receive said filtered and amplified real time acceleration responses, said transmitter further constructed so as to transmit said real time acceleration responses as analog signals;

said device including a first power source connected to said accelerometer, said filter and amplifier and said transmitter, said first power source constructed so as supply power to said accelerometer, said filter and amplifier and said transmitter, said first power source further constructed so as to obtain power from an independent power supply;

said system further including a display apparatus connected to said device through a supply line;

said display apparatus including a remote receiver constructed so as to receive real time analog signals from said transmitter;

said display apparatus including an analog to digital converter being connected to said remote receiver, said converter constructed so as receive said real time analog signals and further constructed to convert said real time analog signals to real time digital signals;

said display apparatus including a computer, said computer being connected to said converter and constructed so as to receive said digital signals, compare stored threshold data with said digital signal and display a resultant value indicative of collapse in real time;

said display apparatus further including a second power source constructed so as to supply power to said remote receiver, said analog to digital converter and said computer;

said second power source further constructed so as to obtain power from a power supply.

12. A system for detecting collapse of structures as recited in claim 11 wherein said accelerometer having a reading range of 0 to 30 Hz.

13. A system for detecting collapse of structures as recited in claim 12 wherein said independent power source comprises internal batteries.

14. A system for detecting collapse of structures as recited in claim 13, wherein said device further comprises an external thermal casing, said casing constructed so as to protect said device from heat damages at temperatures up to 1900° F., said casing further constructed so as to be waterproof.

15. A system for detecting collapse of structures as recited in claim 14, wherein said casing comprises a face plate having an on-off indicator and an attachment means for attaching said device onto said structure.

16. A system for detecting collapse of structures as recited in claim 15, wherein said on-off indicator is selected from a group consisting of a switch mechanism, an audio signal indicator and a visual signal indicator.

17. A system for detecting collapse of structures as recited in claim 16, wherein said attachment means comprises adhesives and bolts.

18. A system for detecting collapse of structures as recited in claim 17, wherein said supply line comprises a waterproof, thermal coating.

19. A system for detecting collapse of structures as recited in claim 18, wherein said supply line comprises at least one wired communication line, said communication line constructed so as to connect said transmitter to said remote receiver.

20. A system for detecting collapse of structures as recited in claim 19, wherein said supply line comprises a wired power supply line, said line constructed so as to supply power from said second power source to said first power source.

21. A system for detecting collapse of structures as recited in claim 20 wherein said computer further comprises a central processing unit connected to a memory unit, said central processing unit further connected to a display unit, said central processing unit further connected to an user input.

22. A system for detecting collapse of structures as recited in claim 21 wherein said first power supply comprises batteries, AC sources and DC sources.

23. A system for detecting collapse of structures as recited in claim 22, wherein said first power source is further constructed so as to receive power from a second power supply housed within said structure.

24. A system for detecting collapse of structures as recited in claim 23, wherein said second power supply comprises an AC source, a DC source and batteries.

25. A system for detecting collapse of structures comprising:
   a device for detecting vibration responses on exterior of said structure said device constructed so as to determine transient amplitude and decay characteristics of said structure, said transient amplitude and decay characteristics indicative of collapse of said structure in real time;
   said device including at least one accelerometer, said accelerometer constructed so as to receive acceleration responses from a structure in real time and in at least one axial direction;
   said device including a filter and amplifier, said filter and amplifier constructed so as to connect to said accelerometer, said filter and amplifier further constructed so as to receive said real time acceleration responses, remove extraneous noise from said acceleration responses and amplify said acceleration responses;
   said device including at least one transmitter, said transmitter constructed so as to connect to said filter and amplifier, said transmitter further constructed so as to receive said filtered and amplified real time acceleration responses, said transmitter further constructed so as to transmit said acceleration responses as real time analog signals;
   said device including a first power source connected to said accelerometer, said filter and amplifier and said transmitter, said first power source constructed so as supply power to said accelerometer, said filter and amplifier and said transmitter, said first power source further constructed so as to obtain power from an independent power supply;
   said system including a communication means for transmitting said real time analog signals to a display apparatus;
   said display apparatus including a remote receiver constructed so as to receive said real time analog signals from said transmitter through said communication means;
   said display apparatus including an analog to digital converter being connected to said remote receiver, said converter constructed so as receive said real time analog signals and further constructed to convert said analog signals to real time digital signals;
   said display apparatus including a computer, said computer being connected to said converter and constructed so as to receive said digital signals, compare stored threshold data with said digital signal and display a resultant value;
   said display apparatus further including a second power source constructed so as to supply power to said remote receiver, said analog to digital converter and said computer, said second power source further constructed so as to obtain power from a power supply.

26. A system for detecting collapse of structures as recited in claim 25 wherein said accelerometer having a reading range of 0 to 30 Hz.

27. A system for detecting collapse of structures as recited in claim 26 wherein said independent power source comprises internal batteries.

28. A system for detecting collapse of structures as recited in claim 27, wherein said device further comprises an external thermal casing, said casing constructed so as to protect said device from heat damages at temperatures up to 1900° F., said casing further constructed so as to be waterproof.

29. A system for detecting collapse of structures as recited in claim 28, wherein said casing comprises a face plate having an on-off indicator and an attachment means for attaching said device onto said structure.

30. A system for detecting collapse of structures as recited in claim 29, wherein said on-off indicator is selected from a group consisting of a switch mechanism, an audio signal indicator and a visual signal indicator.

31. A system for detecting collapse of structures as recited in claim 30, wherein said attachment means comprises adhesives and bolts.

32. A system for detecting collapse of structures as recited in claim 31, wherein said communication means comprises a wireless transmission system.

33. A system for detecting collapse of structures as recited in claim 32 wherein said computer further comprises a central processing unit constructed so as to track said transient amplitude and decay characteristics indicative of structural collapse and on-site data reduction and analysis, said central processing unit provide on-site data reduction and analysis, said central processing unit connected to a memory unit, said central processing unit further connected to a display unit, said display unit constructed so as to display a collapse mechanism in real time, said central processing unit further connected to an user input.

34. A system for detecting collapse of structures as recited in claim 33 wherein said power supply comprises batteries, AC sources and DC sources.

35. A system for detecting collapse of structures as recited in claim 34, wherein said first power source is further constructed so as to receive power from a second power supply housed within said structure.

36. A system for detecting collapse of structures as recited in claim 35, wherein said second power supply comprises an AC source, a DC source and batteries.

37. A system for detecting collapse of structures comprising:
- a device for detecting vibration responses on exterior of said structure said device constructed so as to determine transient amplitude and decay characteristics of said structure said transient amplitude and decay characteristics indicative of collapse of said structure in real time;
- said device including at least one accelerometer, said accelerometer constructed so as to receive acceleration responses from a structure in real time and in at least one axial direction;
- said device including a filter and amplifier, said filter and amplifier constructed so as to connect to said accelerometer, said filter and amplifier further constructed so as to receive said real time acceleration responses, remove extraneous noise from said acceleration responses and amplify said acceleration responses;
- said device including an analog to digital converter constructed so as to connect to said filter and amplifier, said converter further constructed so as to convert said real time acceleration responses to real time digital signals;
- said device including a processor constructed so as to connect to said converter, said processor further constructed so as to process said real time digital signals;
- said device including an identifier, constructed so as to connect to said processor, said identifier further constructed so as to identify data from said device;
- said device including at least one transmitter, said transmitter constructed so as to connect to said filter and amplifier, said transmitter further constructed so as to receive said filtered and amplified real time acceleration responses, said transmitter further constructed so as to transmit said real time digital signals;
- said device including a first power source connected to said accelerometer, said filter and amplifier, said analog to digital converter, said processor, said identifier and said transmitter, said first power source constructed so as supply power to said accelerometer, said filter and amplifier, said analog to digital converter, said processor, said identifier and said transmitter, said first power source further constructed so as to obtain power from an independent power supply.

38. A system for detecting collapse of structures as recited in claim 37 wherein said accelerometer having a reading range of 0 to 30 Hz.

39. A system for detecting collapse of structures as recited in claim 38 wherein said independent power source comprises internal batteries.

40. A system for detecting collapse of structures as recited in claim 39, wherein said device further comprises an external thermal casing, said casing constructed so as to protect said device from heat damages at temperatures up to 1900° F., said casing further constructed so as to be waterproof.

41. A system for detecting collapse of structures as recited in claim 40, wherein said casing comprises a face plate having an on-off indicator and an attachment means for attaching said device onto said structure.

42. A system for detecting collapse of structures as recited in claim 41, wherein said on-off indicator is selected from a group consisting of a switch mechanism, an audio signal indicator and a visual signal indicator.

43. A system for detecting collapse of structures as recited in claim 42, wherein said attachment means comprises adhesives and bolts.

44. A system for detecting collapse of structures comprising:
- a display apparatus including a remote receiver constructed so as to receive real time digital signals from a transmitter;
- said display apparatus including a computer, said computer being connected to said receiver constructed so as to receive said real time digital signals, compare stored threshold data with said digital signal and display a resultant value indicative of collapse in real time;
- said display apparatus further including a second power source constructed so as to supply power to said remote receiver and said computer;
- said second power source further constructed so as to obtain power from a power supply.

45. A system for detecting collapse of structures as recited in claim 44, wherein said computer further comprises a central processing unit constructed so as to track said transient amplitude and decay characteristics indicative of structural collapse and provide on-site data reduction and analysis, said central processing unit connected to a memory unit, said central processing unit further connected to a display unit, said display unit constructed so as to display a collapse mechanism in real time, said central processing unit further connected to an user input.

46. A system for detecting collapse of structures as recited in claim 45 wherein said power supply comprises batteries, AC sources and DC sources.

47. A system for detecting collapse of structures comprising:
- a device for detecting vibration responses on exterior of said structure said device constructed so as to determine transient amplitude and decay characteristics of said structure said transient amplitude and decay characteristics indicative of collapse of said structure in real time;
- said device including at least one accelerometer, said accelerometer constructed so as to receive acceleration responses from a structure in real time and in at least one axial direction;
- said device including a filter and amplifier, said filter and amplifier constructed so as to connect to said accelerometer, said filter and amplifier further constructed so as to receive said real time acceleration responses, remove extraneous noise from said real time acceleration responses and amplify said acceleration responses;
- said device including an analog to digital converter constructed so as to connect to said filter and amplifier, said converter further constructed so as to convert said real time acceleration responses to real time digital signals;

said device including a processor constructed so as to connect to said converter, said processor further constructed so as to process said real time digital signals;

said device including an identifier, constructed so as to connect to said processor, said identifier further constructed so as to identify data from said device;

said device including at least one transmitter, said transmitter constructed so as to connect to said filter and amplifier, said transmitter further constructed so as to receive said filtered and amplified real time acceleration responses, said transmitter further constructed so as to transmit said real time digital signals;

said device including a first power source connected to said accelerometer, said filter and amplifier, said analog to digital converter, said processor, said identifier and said transmitter, said first power source constructed so as supply power to said accelerometer, said filter and amplifier, said analog to digital converter, said processor, said identifier and said transmitter, said first power source further constructed so as to obtain power from an independent power supply;

said system further including a display apparatus connected to said device through a supply line;

said display apparatus including a remote receiver constructed so as to receive said digital signals from said transmitter;

said display apparatus including a computer, said computer being connected to said receiver constructed so as to receive said digital signals, compare stored threshold data with said digital signal and display a resultant value indicative of collapse in real time;

said display apparatus further including a second power source constructed so as to supply power to said remote receiver and said computer;

said second power source further constructed so as to obtain power from a power supply.

48. A system for detecting collapse of structures as recited in claim 47 wherein said accelerometer having a reading range of 0 to 30 Hz.

49. A system for detecting collapse of structures as recited in claim 48 wherein said independent power source comprises internal batteries.

50. A system for detecting collapse of structures as recited in claim 49, wherein said device further comprises an external thermal casing, said casing constructed so as to protect said device from heat damages at temperatures up to 1900° F., said casing further constructed so as to be waterproof.

51. A system for detecting collapse of structures as recited in claim 50, wherein said casing comprises a face plate having an on-off indicator and an attachment means for attaching said device onto said structure.

52. A system for detecting collapse of structures as recited in claim 51, wherein said on-off indicator is selected from a group consisting of a switch mechanism, an audio signal indicator and a visual signal indicator.

53. A system for detecting collapse of structures as recited in claim 52, wherein said attachment means comprises adhesives and bolts.

54. A system for detecting collapse of structures as recited in claim 53, wherein said supply line comprises a waterproof, thermal coating.

55. A system for detecting collapse of structures as recited in claim 54, wherein said supply line comprises at least one wired communication line, said communication line constructed so as to connect said transmitter to said remote receiver.

56. A system for detecting collapse of structures as recited in claim 55, wherein said supply line comprises a wired power supply line, said line constructed so as to supply power from said second power source to said first power source.

57. A system for detecting collapse of structures as recited in claim 56 wherein said computer further comprises a central processing unit constructed so as to track said transient amplitude and decay characteristics indicative of structural collapse and provide on-site data reduction and analysis, said central processing unit provide on-site data reduction and analysis, said central processing unit connected to a memory unit, said central processing unit further connected to a display unit, said display unit constructed so as to display a collapse mechanism in real time, said central processing unit further connected to an user input.

58. A system for detecting collapse of structures as recited in claim 57 wherein said first power supply comprises batteries, AC sources and DC sources.

59. A system for detecting collapse of structures as recited in claim 58, wherein said first power source is further constructed so as to receive power from a second power supply housed within said structure.

60. A system for detecting collapse of structures as recited in claim 59, wherein said second power supply comprises an AC source, a DC source and batteries.

61. A system for detecting collapse of structures comprising:

a device for detecting vibration responses on exterior of said structure said device constructed so as to determine transient amplitude and decay characteristics of said structure said transient amplitude and decay characteristics indicative of collapse of said structure in real time;

said device including at least one accelerometer, said accelerometer constructed so as to receive acceleration responses from a structure in real time and in at least one axial direction;

said device including a filter and amplifier, said filter and amplifier constructed so as to connect to said accelerometer, said filter and amplifier further constructed so as to receive said real time acceleration responses, remove extraneous noise from said real time acceleration responses and amplify said acceleration responses;

said device including an analog to digital converter constructed so as to connect to said filter and amplifier, said converter further constructed so as to convert said real time acceleration responses to real time digital signals;

said device including a processor constructed so as to connect to said converter, said processor further constructed so as to process said real time digital signals;

said device including an identifier, constructed so as to connect to said processor, said identifier further constructed so as to identify data from said device;

said device including at least one transmitter, said transmitter constructed so as to connect to said filter and amplifier, said transmitter further constructed so as to receive said filtered and amplified real time acceleration responses, said transmitter further constructed so as to transmit said digital signals;

said device including a first power source connected to said accelerometer, said filter and amplifier, said analog to digital converter, said processor, said identifier and said transmitter, said first power source constructed so as supply power to said accelerometer, said filter and amplifier, said analog to digital converter, said processor, said identifier and said transmitter, said first power source further constructed so as to obtain power from an independent power supply;

said system including a communication means for transmitting said digital signals to a display apparatus;

said display apparatus including a remote receiver constructed so as to receive said digital signals from said transmitter through said communication means;

said display apparatus including a computer, said computer being connected to said receiver constructed so as to receive said real time digital signals, compare stored threshold data with said digital signal and display a resultant value indicative of collapse in real time;

said display apparatus further including a second power source constructed so as to supply power to said remote receiver and said computer;

said second power source further constructed so as to obtain power from a power supply.

62. A system for detecting collapse of structures as recited in claim 61 wherein said accelerometer having a reading range of 0 to 30 Hz.

63. A system for detecting collapse of structures as recited in claim 62 wherein said independent power source comprises internal batteries.

64. A system for detecting collapse of structures as recited in claim 63, wherein said device further comprises an external thermal casing, said casing constructed so as to protect said device from heat damages at temperatures up to 1900° F., said casing further constructed so as to be waterproof.

65. A system for detecting collapse of structures as recited in claim 64, wherein said casing comprises a face plate having an on-off indicator and an attachment means for attaching said device onto said structure.

66. A system for detecting collapse of structures as recited in claim 65, wherein said on-off indicator is selected from a group consisting of a switch mechanism, an audio signal indicator and a visual signal indicator.

67. A system for detecting collapse of structures as recited in claim 66, wherein said attachment means comprises adhesives and bolts.

68. A system for detecting collapse of structures as recited in claim 67, wherein said communication means comprises a wireless transmission system.

69. A system for detecting collapse of structures as recited in claim 68 wherein said computer further comprises a central processing unit constructed so as to track said transient amplitude and decay characteristics indicative of structural collapse and provide on-site data reduction and analysis, said central processing unit provide on-site data reduction and analysis, said central processing unit connected to a memory unit, said central processing unit further connected to a display unit, said display unit constructed so as to display a collapse mechanism in real time, said central processing unit further connected to an user input.

70. A system for detecting collapse of structures as recited in claim 69 wherein said power supply comprises batteries, AC sources and DC sources.

71. A system for detecting collapse of structures as recited in claim 70, wherein said first power source is further constructed so as to receive power from a second power supply housed within said structure.

72. A system for detecting collapse of structures as recited in claim 71, wherein said second power supply comprises an AC source, a DC source and batteries.

73. A method for detecting collapse of structures comprising:

(a) attaching a device having at least one accelerometer, a filter and amplifier, at least on transmitter and an on-off indicator onto an exterior surface of a structure;

(b) monitoring transient amplitude and decay responses of said structure in real time using said at least one accelerometer;

(c) reducing noise and amplifying said responses using said filter and amplifier;

(d) converting said response to a real time analog signal;

(e) transmitting said signal in real time to a remote receiver using said transmitter;

(f) receiving said signal using said remote receiver and transmitting said signal to a computer having a central processing unit;

(g) tracking said transient amplitude and decay characteristics indicative of structural collapse, providing on-site data reduction and analysis, providing on-site data reduction and analysis using said central processing unit and digitizing said signal in real time using said computer and comparing said signal to a threshold value;

(h) transmitting said digitized signal from said computer to said device;

(i) displaying said signal in real time on said device; and (j) notifying an operator of collapse situation of said structure using said device.

74. A method for detecting collapse of structures as recited in claim 73 and further comprising:

monitoring acceleration responses in real time during burn of said structure, collapse of said structure and post collapse of said structure.

75. A system for detecting collapse of a structure in real time comprising:

a means for detecting vibration responses on exterior of said structure said means constructed so as to determine transient amplitude and decay characteristics of said structure said transient amplitude and decay characteristics indicative of collapse of said structure in real time;

a means for removing extraneous noise from said vibration responses and amplifying said responses, said means connected to said means for detecting vibration responses; a means for transmitting filtered and amplified responses, for converting said acceleration responses to an analog signal and for transmitting said signal, said means transmitting filtered and amplified responses connected to said means for detecting said responses;

a means for supplying power from dependent and independent power supplies to said means for detecting said responses, said means for removing extraneous noise and amplifying said acceleration responses and said means for transmitting filtered and amplified responses.

76. A system for detecting collapse of structures as recited in claim 75 wherein said means for detecting responses constructed to have a reading range of 0 to 30 Hz.

77. A system for detecting collapse of structures as recited in claim 76 wherein said means for supplying independent power source comprises internal batteries.

78. A system for detecting collapse of structures as recited in claim 77, wherein said system further comprises an external thermal casing, said casing constructed so as to protect said system from heat damages at temperatures up to 1900° F., said casing further constructed so as to be waterproof.

79. A system for detecting collapse of structures as recited in claim 78, wherein said casing comprises a face plate having an on-off indicator and an attachment means for attaching said device onto said structure.

80. A system for detecting collapse of structures as recited in claim 79, wherein said on-off indicator is selected from a group consisting of a switch mechanism, an audio signal indicator and a visual signal indicator.

81. A system for detecting collapse of structures as recited in claim 80, wherein said attachment means comprises adhesives and bolts.

82. A system for detecting collapse of structures comprising:
- a display means for receiving real time analog signals connected to a means for converting said real time analog signals to real time digital signals and transmitting said signals to a remote receiver means;
- a means for tracking said transient amplitude and decay characteristics indicative of structural collapse, said means receiving and storing said real time digital signals, providing on-site data reduction and analysis comparing said real time signals to threshold amplitude and decay values and transmitting said values to a display unit means for displaying a collapse mechanism in real time;
- said display means including a second power means for supplying power to said remote receiver, said converter means and said tracking means, said second power means further constructed so as to obtain power from a power supply.

83. A system for detecting collapse of structures as recited in claim 82 wherein said power supply comprises batteries, AC sources and DC sources.

* * * * *